United States Patent
Sheets

(10) Patent No.: US 11,847,199 B2
(45) Date of Patent: *Dec. 19, 2023

(54) REMOTE USAGE OF LOCALLY STORED BIOMETRIC AUTHENTICATION DATA

(71) Applicant: Visa International Service Association, San Francisco, CA (US)

(72) Inventor: John Sheets, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/685,275

(22) Filed: Mar. 2, 2022

(65) Prior Publication Data

US 2022/0318355 A1    Oct. 6, 2022

Related U.S. Application Data

(63) Continuation of application No. 16/316,572, filed as application No. PCT/US2017/045956 on Aug. 8, 2017, now Pat. No. 11,308,189.

(60) Provisional application No. 62/409,258, filed on Oct. 17, 2016, provisional application No. 62/378,626, filed on Aug. 23, 2016.

(51) Int. Cl.
G06F 21/00     (2013.01)
G06F 21/32     (2013.01)
H04L 9/40      (2022.01)
H04W 12/065    (2021.01)
G06F 16/903    (2019.01)

(52) U.S. Cl.
CPC ............ *G06F 21/32* (2013.01); *G06F 16/903* (2019.01); *H04L 63/0861* (2013.01); *H04W 12/065* (2021.01)

(58) Field of Classification Search
CPC ... G06F 21/32; G06F 16/903; H04L 63/0861; H04W 12/065; H04W 12/06
See application file for complete search history.

(56) References Cited

U.S. PATENT DOCUMENTS 8,656,279 B2 *  2/2014  Haug ............... G06F 3/017
                                             715/863
10,778,676 B1   9/2020  Griffin et al.
                (Continued)

FOREIGN PATENT DOCUMENTS

CN    101154263    4/2008
CN    102067555    5/2011
          (Continued)

OTHER PUBLICATIONS

Application No. EP22168048.1, Extended European Search Report, dated Jul. 8, 2022, 8 pages.

(Continued)

*Primary Examiner* — Brandon Hoffman
*Assistant Examiner* — William A Corum, Jr.
(74) *Attorney, Agent, or Firm* — Kilpatrick Townsend & Stockton LLP

(57) ABSTRACT

A method for biometric authentication is disclosed. Reference biometric data established at a first device can be stored at a backend server computer. The server computer can then provide the reference biometric data with a second device when needed for biometric authentication at the second device.

19 Claims, 12 Drawing Sheets

(56) References Cited

U.S. PATENT DOCUMENTS

| | | | |
|---|---|---|---|
| 2008/0019573 A1 | 1/2008 | Baltatu et al. | |
| 2009/0190802 A1 | 7/2009 | Adams et al. | |
| 2010/0325442 A1 | 12/2010 | Petrone et al. | |
| 2014/0235171 A1* | 8/2014 | Molettiere | A61B 5/486 455/41.2 |
| 2015/0016694 A1* | 1/2015 | Kerr | G06V 40/50 382/124 |
| 2015/0046990 A1* | 2/2015 | Oberheide | G06F 21/45 726/5 |
| 2015/0235017 A1 | 8/2015 | Oberheide et al. | |
| 2015/0302060 A1* | 10/2015 | Thuillier | G06F 21/32 707/769 |
| 2016/0164849 A1 | 6/2016 | Smith | |
| 2016/0277380 A1 | 9/2016 | Wagner et al. | |
| 2017/0324736 A1* | 11/2017 | Connell, II | G06F 21/32 |
| 2020/0092102 A1 | 3/2020 | Wang | |

FOREIGN PATENT DOCUMENTS

| | | |
|---|---|---|
| CN | 104662864 | 5/2015 |
| WO | 2013177304 | 11/2013 |
| WO | 2016114937 A1 | 7/2016 |
| WO | 2016118304 A1 | 7/2016 |
| WO | 2018038914 | 3/2018 |
| WO | 2018222211 | 12/2018 |

OTHER PUBLICATIONS

Application No. EP17755359.1 , Notice of Decision to Grant, dated Mar. 17, 2022, 2 pages.
U.S. Appl. No. 16/316,572 , Notice of Allowance, dated Dec. 15, 2021, 17 pages.
U.S. Appl. No. 16/316,572 , "Supplemental Notice of Allowability", dated Dec. 22, 2021, 2 pages.
AU2017316312, "First Examination Report", dated Jun. 11, 2021, 3 pages.
AU2017316312 , "Notice of Acceptance", dated Jan. 11, 2022, 3 pages.
AU2017316312 , "Second Examination Report", dated Aug. 20, 2021, 4 pages.
Application No. CN201780050178.9 , Notice of Decision to Grant, dated Dec. 3, 2021, 4 pages.
Application No. CN201780050178.9 , Office Action, dated Dec. 11, 2020, 22 pages.
Application No. CN201780050178.9 , Office Action, dated Jul. 14, 2021, 6 pages.
Application No. EP17755359.1 , Office Action, dated Nov. 17, 2020, 8 pages.
Application No. KR10-2019-7008383 , Office Action, dated Aug. 2, 2021, 12 pages.
Application No. PCT/US2017/045956 , International Preliminary Report on Patentability, dated Mar. 7, 2019, 12 pages.
Application No. PCT/US2017/045956 , International Search Report and Written Opinion, dated Dec. 11, 2017, 20 pages.
PCT/US2017/045956 , "Invitation to Pay Add'l Fees and Partial Search Report", dated Oct. 17, 2017, 11 pages.
AU2022202047 , "Notice of Acceptance", dated May 25, 2023, 3 pages.
AU2022202047 , "First Examination Report", dated Feb. 14, 2023, 3 pages.
Application No. KR2022-7015661 , Office Action, dated Feb. 15, 2023, 3 pages.

* cited by examiner

REMOTE USAGE OF LOCALLY STORED BIOMETRIC AUTHENTICATION DATA

CROSS REFERENCE TO RELATED APPLICATIONS

This application is a continuation of U.S. application Ser. No. 16/316,572filed Jan. 9, 2019 which is a 371 patent application of International Application No. PCT/US2017/045956, filed Aug. 8, 2017, which claims the benefit of the filing date of U.S. Provisional Application No. 62/409,258, filed on Oct. 17, 2016, as well as U.S. Provisional Application No. 62/378,626, filed on Aug. 23, 2016, both of which are herein incorporated by reference in their entireties for all purposes.

BACKGROUND

Biometric authentication enables a user to be authenticated based on personal biological traits, such as a fingerprint. Some applications allow a user to gain access to personal information via biometric authentication. To enroll in biometric authentication for accessing an application at a personal device (e.g., a smartphone), a user provides a first biometric, such as an initial fingerprint, to be used as a reference. The device stores information about the reference biometric for future use. At a later time, when the user wishes to access the application, the user provides a new biometric, such as a new fingerprint. The new biometric is compared with the reference biometric, and if they are determined to match, the user is authenticated.

While biometric authentication is helpful in this manner, it can be cumbersome and have limited applications. For example, a user may have to enroll in biometric authentication separately for different applications and devices. As a result, if a user obtains a new device, the user has to repeat the entire enrollment process for each application before being able to access the applications as normal. This is inconvenient and burdensome, especially for a user that interacts with different devices and/or applications.

Embodiments of the invention address these and other problems individually and collectively.

SUMMARY

Embodiments of the invention are directed to methods and systems for storing and sharing biometric data. For example, a reference biometric template created at a first user device can be transmitted to and stored at a server computer. Then, the reference biometric template can be transmitted to a second user device, such that biometric authentication can be used at the second user device without having to establish another reference biometric template or otherwise repeat the enrollment process.

One embodiment of the invention is directed to a method. The method comprises receiving a reference biometric template and a first parameter value from a first user device, and storing the reference biometric template and the first parameter value. The method further includes receiving a request for accessing data including a new biometric template and a second parameter value from a second user device, identifying the reference biometric template and an associated dataset based on a comparison of the second parameter value with the first parameter value, and authenticating the new biometric template based on a comparison with the reference biometric template. The method also comprises transmitting an authentication approval message to the second user device based on authenticating the new biometric template. The second user device then grants access to the dataset based on the authentication approval message.

Another embodiment of the invention is directed to a method comprising receiving a reference biometric template from a first user device and storing the reference biometric template. The method also includes receiving a request for the reference biometric template from a second user device, and identifying the reference biometric template. The method further comprises providing the reference biometric template to the second user device in response to identifying the reference biometric template. The second user device authenticates a user based on a comparison of a new biometric template with the reference biometric template.

Another embodiment of the invention is directed to an application service provider computer configured to perform the above-described method.

Further details regarding embodiments of the invention can be found in the Detailed Description and the Figures.

DETAILED DESCRIPTION

Figure 1:
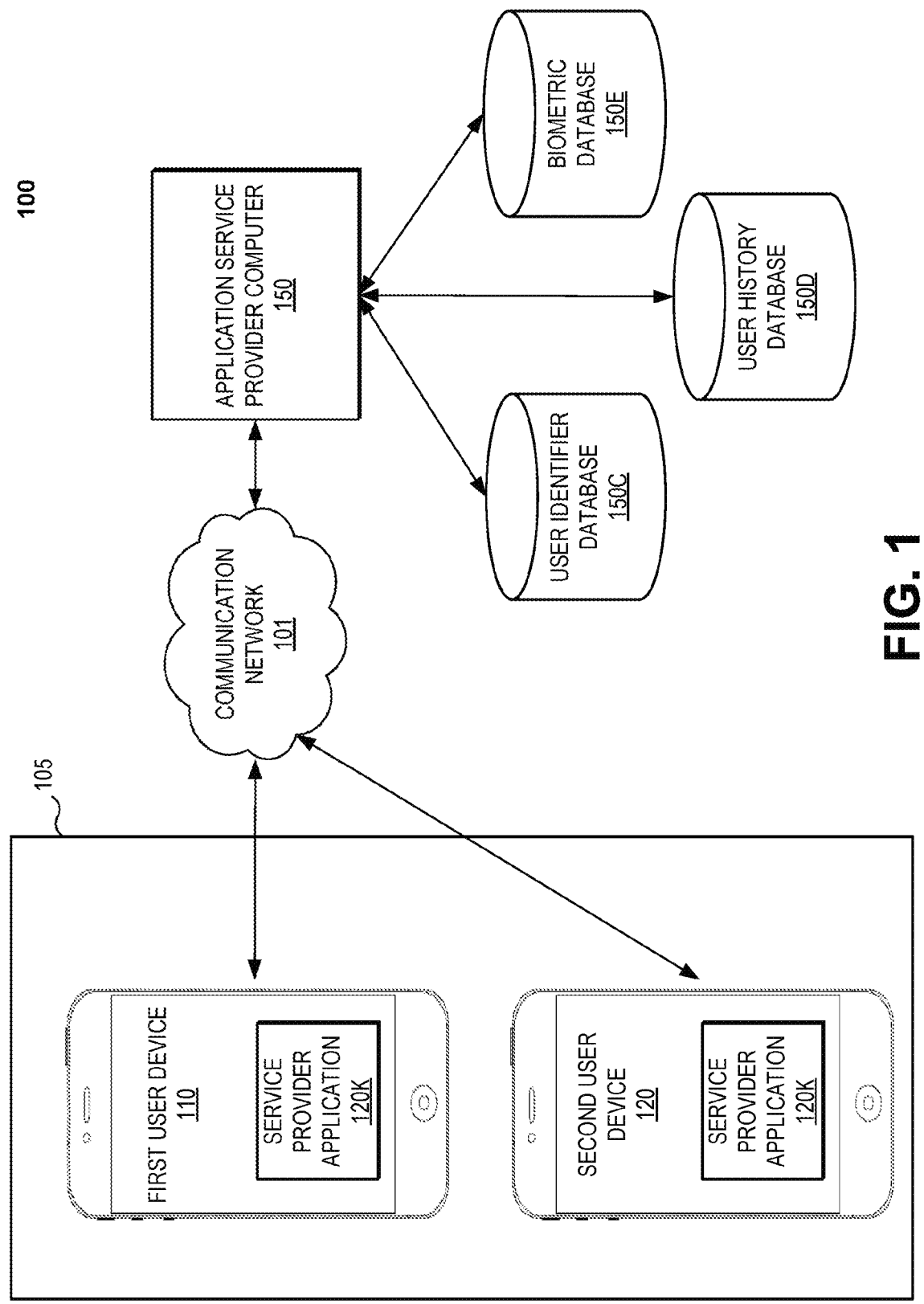
FIG. 1 shows a block diagram of a system according to an embodiment of the invention.

Embodiments of the invention are directed to methods and systems for storing and sharing biometric data. For example, a reference biometric template created at a first user device can be transmitted to and stored at a server computer. Then, the reference biometric template can be transmitted to a second user device, such that biometric authentication can be used at the second user device without having to establish another reference biometric template or otherwise repeat the enrollment process.

Embodiments allow a reference biometric template to be identified and shared based on one or more types of information. For example, a reference biometric template can be identified using a user identifier, or any other suitable identification data.

In some embodiments, a reference biometric template can be identified using device parameter information, such as a location, time, device settings, etc. Device parameter information can match with multiple reference biometric templates, which may need to be further sorted to identify the correct reference biometric template. Accordingly, embodiments allow a new biometric template to be compared with each identified reference biometric template to find a match.

In further embodiments, a single voice command can be used to activate an application at a second user device, and then be used as a voice sample for biometric authentication. The voice sample (or a template based on the voice sample) can be sent to a server computer along with one or more device parameters in order to identify a matching reference voice template. The reference voice template can then be returned to the second user device and used for biometric authentication.

Prior to discussing specific embodiments of the invention, some terms may be described in detail.

The term "authentication" may refer to the process of verifying the identity of something (e.g., a user). One form of authentication can be biometric authentication.

A "biometric" may be any human characteristic that is unique to an individual. For example, a biometric may be an intrinsic biological trait or a distinguishable human behavior. Examples of biometrics include a person's fingerprint, facial structure, DNA, voice, retina, iris, palm print, hand geometry, etc.

A "biometric template" may refer to data that represents a biometric. A biometric template can be obtained by a biometric reader. The data may be either an analog or digital representation of the user's biometric. For example, a biometric template of a user's face may be image data, and a biometric template of a user's voice may be an audio file. Biometric templates can further include data representing measurements of any other intrinsic human traits or distinguishable human behaviors, such as fingerprint data, retinal scan data, deoxyribonucleic acid (DNA) data, palm print data, hand geometry data, iris recognition data, vein geometry data, handwriting style data, and any other suitable data associated with physical or biological aspects of an individual. In some embodiments, a biometric template can be a file containing distinct characteristics extracted from a biometric. For example, a biometric template may be a binary mathematical file representing the unique features of an individual's fingerprint, eye, hand or voice needed for performing accurate authentication of the individual.

A "biometric reader" may refer to a device for measuring a biometric. Examples of biometric readers may include fingerprint readers, front-facing cameras, microphones, iris scanners, and DNA analyzers.

The term "zero-knowledge proof" or "zero-knowledge protocol" may refer to a method of proving information is true without conveying the actual information itself. In a zero-knowledge protocol, secret information can be verified without being revealed. More information regarding zero-knowledge proofs may be found at:
J. Camenisch and M. Stadler. Proof systems for general statements about discrete logarithms. Technical Report TR 260, Institute for Theoretical Computer Science, ETH Zürich, March 1997.
In some embodiments, the comparison of biometric templates to verify the authenticity of a particular person may employ a zero-knowledge protocol.

A "predetermined threshold" can be a minimum prescribed level. For example, a predetermined threshold can identify or quantify what degree of similarity is needed between two biometric templates (or other data) in order for the two biometric templates to qualify as a match. As an illustration, fingerprints contain a certain number of identifying features. If a threshold amount (e.g., 90%) of identifying features of a newly measured fingerprint are matched to a previously measured fingerprint, then the two fingerprints can be considered a match (and the probability that both fingerprints are from the same person may be high). Setting an appropriate threshold to ensure an acceptable level of accuracy and confidence would be appreciated by one of ordinary skill in the art.

The term "validation" may refer to the act of checking or affirming that information is legitimate. An example may be the act of checking that a digital signature is, in fact, legitimate and of the signing entity. Digital signatures may be validated according to a verification algorithm in conjunction with a signing entity's public key.

A "user device" may include an electronic apparatus operated by an individual. For example, in some embodiments a user device can be a personal device such as a mobile device or a desktop computer. In other embodiments, a user device can be a terminal with which a user interacts, such as an access terminal, a security gate terminal, a POS (point of sale) terminal, or any other suitable device.

A "mobile device" may include any suitable device that is moveable. In some embodiments, a mobile device may be any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, WI-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "parameter value" may include information about a condition or factor. Examples of parameter values include location information and time information. Additional parameter values associated with a user device or user behavior can include an IP address, a battery level, a velocity of movement (e.g., 60 MPH), an amount of available memory, login frequency, day of the week, the order in which different applications are opened, language settings, time zone, device operating system, user device metadata, and any other suitable information related to the current state of the user device.

An "application" may be computer code or other data stored on a computer readable medium (e.g. memory element or secure element) that may be executable by a processor to complete a task.

A "server computer" may include a powerful computer or cluster of computers. For example, the server computer can be a large mainframe, a minicomputer duster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a first user device 110 that is operated by a user and that includes a service provider application 120K. The system 100 also includes a second user device 120 that is also operated by the user and includes a copy of the same service provider application 120K. In some embodiments, the first user device 110 and second user device 120 are located at a same or similar location 105. The system 100 further includes an application service provider computer 150 which may be embodied by one or more computers. The application service provider computer 150 can include, or be in communication with, one or more user databases. Such user databases can include a user identifier database 150C, a biometric database 150E, and a user history database 150D. The first user device 110 and second user device 120 can both be in operative communication with an application service provider computer 150 via any suitable communication channel or communications network 101. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The first user device 110 and/or the second user device 120 may be any suitable type of device operated by a user. For example, the first user device 110 and/or the second user device 120 may be a mobile device (e.g., a smartphone), a tablet, a desktop computer, a wearable device (e.g. smart watch or eyewear), a smart vehicle, an access device (e.g., a POS terminal), an access gate (e.g., for accessing a physical space), a smart appliance (e.g., refrigerator, thermostat, etc.), a payment card, a key fob, or any other suitable type of consumer device. In some embodiments, the first user device 110 may be a device that is typically used by the user (e.g., a primary device). In contrast, the second user device 120 may a device that the user has never used or does not typically use. For example, the second user device 120 may be a newly acquired device, a friend's device, or a public device.

Figure 2:
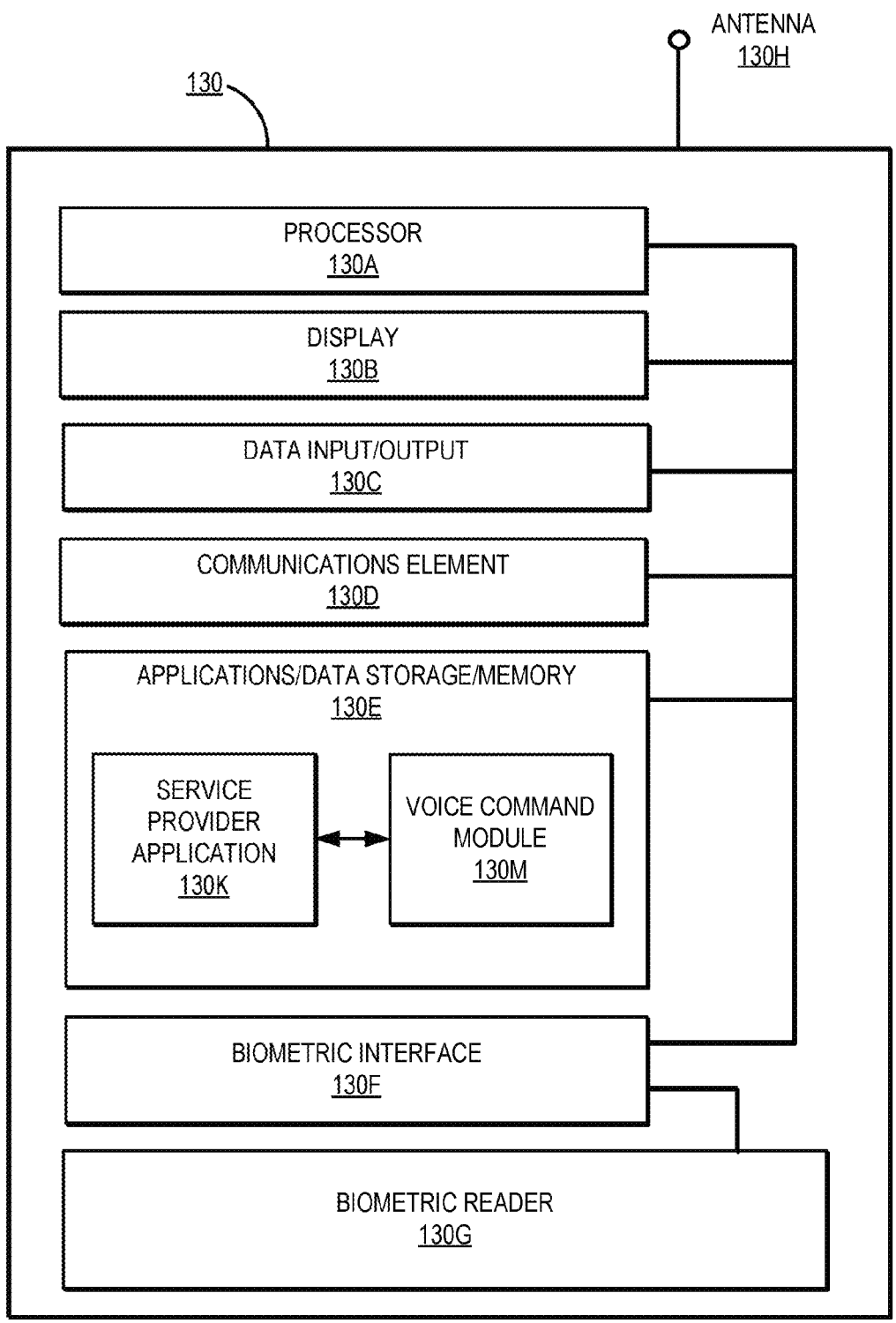
FIG. 2 shows a block diagram of an exemplary mobile device according to an embodiment of the invention.

An example of a user device in the form of a mobile device 130, according to some embodiments of the invention, is shown in FIG. 2. The mobile device 130 may comprise memory 130E. The mobile device 130 may further comprise a biometric reader 130G for reading biometrics of a user and a biometric interface 130F for transmitting data between the biometric reader 130G and an application of the user device. Examples of a biometric reader 130G may include a fingerprint reader, a front-facing camera (e.g., for iris recognition or facial recognition), a microphone (e.g., for voice recognition), etc.

The mobile device 130 may further comprise communications element 130D for allowing communications between user device 130 and other devices, such as through wireless communications (e.g. via antenna 130H). In addition, the mobile device 130 may also comprise data input/output 130C for receiving inputs from a user. For example, data input/output 130C may be an input element of a touchscreen from which display icons may be selected, and from which a virtual keyboard may be displayed to receive user commands. The mobile device 130 may also comprise display 130B for displaying data to a user and processor 130A for processing data and executing instructions to complete tasks.

The memory 130E may store data, such as data for one or more applications. The one or more applications may include service provider application 130K and the voice command module 130M. The mobile device 130 may have any number of mobile applications installed or stored on the memory 130E and is not limited to that shown in FIG. 2.

The service provider application 130K can include instructions for providing one or more services. For example, in some embodiments, the service provider application 130K can be a banking application, an email application, a physical access application, a home security application, a social network application, or an application for any other suitable service. The service provider application 130K can include instructions for accessing and interacting with a user account (e.g., an email account or a bank account), or instructions for otherwise gaining access to and utilizing data. In other embodiments, service provider application 130K can include instructions for accessing the internet in order to reach a service hosted on the internet (e.g., internet banking).

In some embodiments, the service provider application 130K can include instructions for gaining access (e.g., to data, an account, physical space, security controls, etc.) via biometric authentication. For example, the service provider application 130K can comprise instructions for receiving biometric data from the biometric reader 130G (e.g., via the biometric interface 130F) and generating a biometric template from the biometric data. The biometric template can be data comprising features of a biometric required for accurate matching. The biometric template may comprise information such as position, type, and angle and/or may comprise pattern information (ridge structure) as described in ISO/IEC JTC 1/SC 37. For example, the biometric template may comprise features of a user's fingerprint data that consistently appear in biometric data. This may include features that may be detected no matter where a user's finger is positioned on the fingerprint reader when a sample is taken, such as the relative position that lines (i.e. contours) that make up the user's fingerprint are to one another. In another example, a user may present his or her biometric multiple times, and a statistical model may be used to generate a biometric template that captures the top features that have the greatest probability of appearing the next time the user biometric is measured.

According to embodiments, a user may enroll into a biometric authentication program for proving his or her identity to login to the service provider application 130K. The service provider application 130K can include instructions for generating a first biometric template against which a second biometric template can be compared during future login attempts. This first (or reference) biometric template can be used to validate a second (or new) biometric template, and to thereby authenticate a user for accessing an account.

The mobile device 130 can, in some embodiments, locally store a reference biometric template along with other user information (e.g., a user ID) and account data (e.g., secure data) at the memory 130E. Additionally, the service provider application 130K can include instructions for sending (e.g. via communications element 130D and antenna 130H) the reference biometric template to the application service provider computer 150, which can in turn share the reference biometric template with other user devices (e.g., the second user device 120). Similarly, the service provider application 130K can include instructions for retrieving a reference biometric template from the application service provider computer 150 (e.g., by sending a user ID or a new biometric to the application service provider computer 150 for use in identifying the reference biometric template).

The service provider application 130K can further include instructions for measuring one or more mobile device 130 parameters and sending the parameters to the application service provider computer 150. Device parameters can include a location (e.g., GPS coordinates), a time, a battery level, etc.

The voice command module 130M can include instructions for receiving speech from a user (e.g., via a microphone), analyzing the speech to determine the words spoken, analyzing the words spoken to determine a command, and performing any suitable task based on the instruction. For example, the voice command module 130M can, in conjunction with the processor 130A, cause a user device to activate an application, initiate a download, identify stored information, perform an internet search, or execute any suitable process. The voice command module can also pass information to another application, such that the application can perform one or more tasks. As examples, a voice command module can include Apple Siri, Google Now, Pico TTS, Microsoft Cortana, Skype Translator, and iFlyTek voice search.

In some embodiments, the service provider application 130K can represent the service provider application 120K shown in FIG. 1. Additionally, in some embodiments, the service provider application 130K can be provided by the application service provider computer 150 shown in FIG. 1.

In some embodiments, the application service provider computer 150 can provide a service and/or an application for accessing the service. For example, the application service provider computer 150 can provide a banking service, an email service, a physical access service, a home security system service, a social network service, etc. In some embodiments, the application service provider computer 150 can provide these services via a service provider application 120K and/or via a website that can be accessed by a user device.

The application service provider computer 150 can also store user account information, such as reference biometric data associated with access privileges, data associated with a user account, etc. The stored biometric data may be information that is typically stored locally at a user device.

In some embodiments, the application service provider computer 150 can provide a cloud-based service that, in addition to storing information that is local to a first user device 110, also makes the information available to other devices (e.g., the second user device 120). For example, the application service provider computer 150 can provide a reference biometric template (and/or other data) to a new user device (e.g., the second user device 120). As a result, biometric authentication data that is typically local to one device can be extended to other devices.

In further embodiments, the application service provider computer 150 can compare biometric templates to find matches. Additionally, the application service provider computer 150 can store and compare information about user device parameters, such as information about locations from which the user has accessed data.

In some embodiments, the application service provider computer 150 can act as a database for user account data (e.g., biometric data) for multiple types of applications and user accounts. For example, the application service provider computer 150 may not provide a specific service application, but may instead act as a central user account data storage hub for multiple types of applications.

Figure 3:
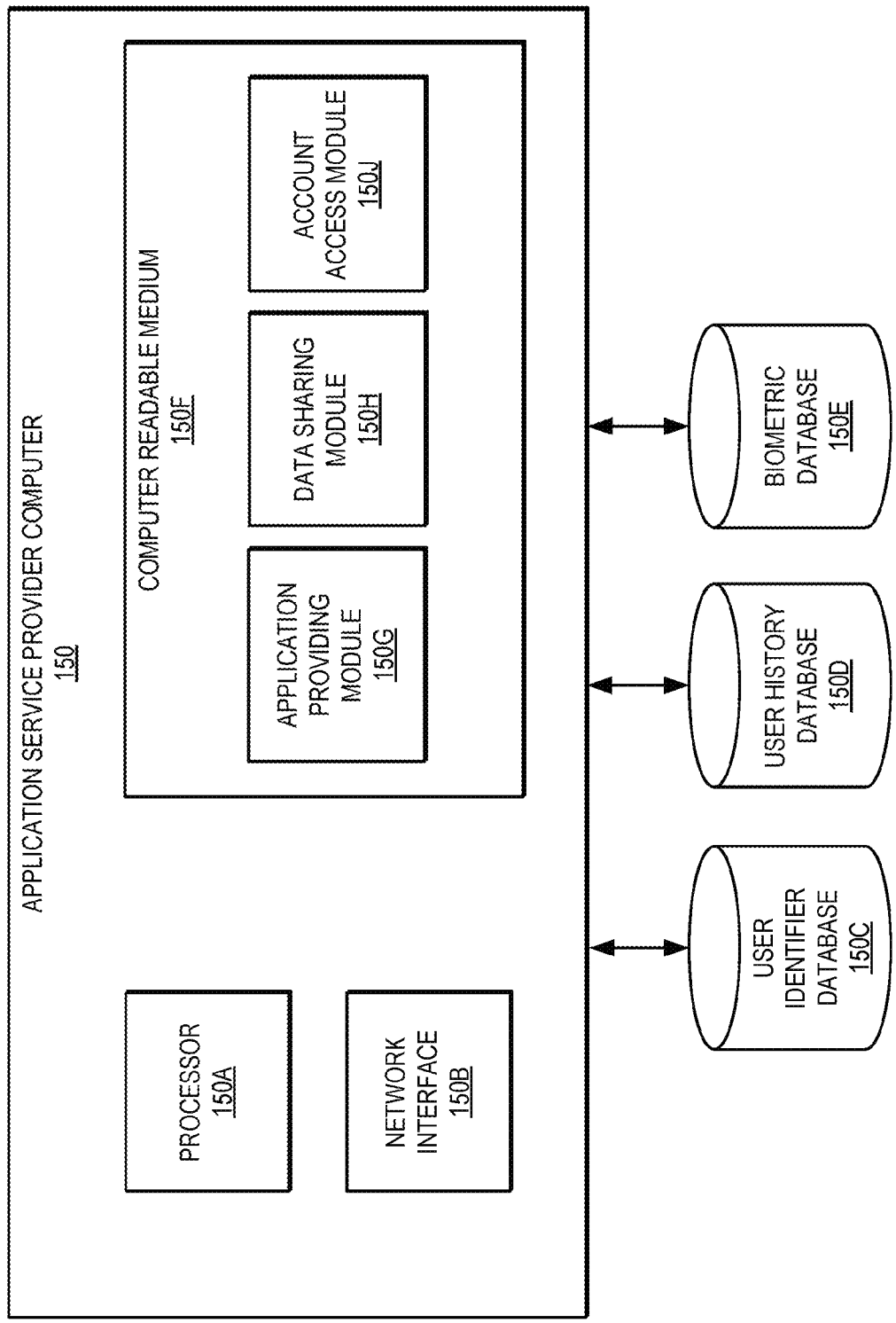
FIG. 3 shows a block diagram of an application service provider computer according to an embodiment of the invention.

An example of the application service provider computer 150, according to some embodiments of the invention, is shown in FIG. 3. The application service provider computer 150 comprises a processor 150A, a network interface 160B, a computer readable medium 150F, and one or more user databases such as a user identifier database 150C, a user history database 150D, and a biometric database 150E.

The user identifier database 150C can be a database in which a user dataset (e.g., account data, a secure information, access credentials, home security controls) is linked to a user identifier. For example, a user ID (e.g., a username, an email address, a phone number, etc.) can be uniquely associated with a user account. The user ID can also be linked with other access credentials (e.g., a password or biometric data). When a user enters a user ID and other necessary access credentials, the account data can be identified and provided to the user.

The biometric database 150E can be a database in which a reference biometric template is linked to a user identifier (or other suitable user data). For example, a reference biometric template can be linked to a user ID in a mapping table (i.e. lookup table) which may later be queried to retrieve the reference biometric template. For example, the biometric database 150E may be a relational database in which reference biometric templates in a column are each linked in a row to one or more user identifiers. In some embodiments, the biometric database 150E can also or instead link a user ID (or other user-related data) to a password, PIN, or other authentication information.

The user history database 150D can be a database in which a user's behavioral data can be linked with a user ID, a reference biometric template, or other suitable information. For example, information about parameters associated with a user's account activity can be stored, such as locations and times. As a result, a user account, user ID, and/or reference biometric template can be identified based parameters associated with a current login attempt. Embodiments also allow a group of accounts, as well as their corresponding reference biometric templates, to be identified based on parameters in the user history database 150D.

The computer readable medium 150F may comprise an application providing module 150G, a data sharing module 150H, an account access module 150J, and any other suitable software module. The computer readable medium 150F may also comprise code, executable by the processor 150A for implementing a method comprising receiving from a first user device, a reference biometric template and a first parameter value; storing the reference biometric template and the first parameter value; receiving from a second user device, a request for accessing data, the request including a new biometric template and a second parameter value; identifying the reference biometric template and an associated dataset based on a comparison of the second parameter value with the first parameter value; authenticating the new biometric template based on a comparison with the reference biometric template; and based on authenticating the new biometric template, transmitting an authentication approval message to the second user device, wherein the second user device grants access to the dataset based on the authentication approval message. The computer readable medium 150F can further comprise code, executable by the processor 150A for implementing a method comprising receiving from a first user device, a reference biometric template; storing the reference biometric template; receiving from a second user device, a request for the reference biometric template; identifying the reference biometric template; and in response to identifying the reference biometric template, providing the reference biometric template to the second user device, wherein the second user device authenticates a user based on a comparison of a new biometric template with the reference biometric template.

The application providing module 150G may comprise code that causes the processor 150A to provide service provider applications to user devices. For example, the transaction processing module 150G may contain logic that causes the processor 150A to transmit application code to a user device in response to a download request, as well as send future updates. Additionally, the application providing module 150G can comprise instructions for interacting with an application running on a user device. For example, the application providing module 150G can cause the processor 150A to identify a user account in response to a login at a user device, and to transmit user data to a user device (e.g., such that a user device can access an account).

In some embodiments, the application providing module 150G can include code for generating a unique encryption key pair for each instance of the application on a user device. A unique private key can be provided to each application. As a result, the application service provider computer 150 can encrypt information being sent to a specific user device using a public key, and the user device can decrypt the information using a corresponding private key. In addition, the application service provider computer 150 can provide a public key to each user device. As a result, each user device can encrypt information sent to the application service provider computer 150 with the public key, and the application service provider computer 150 can decrypt the information with a corresponding private key.

The data sharing module 150H may comprise code that causes the processor 150A to store, identify, and transmit a reference biometric template and/or other user data. For example, the data sharing module 150H may contain logic that causes the processor 150A to look up data (e.g., a reference biometric template) in a database (e.g., the biometric database 150E) based on a received user ID. For example, the biometric database 150E may be a relational database, and the data sharing module 150H may include instructions for retrieving a row of data in the relational database that comprises a user ID received in a reference biometric template request message from a user device. The row of data may further comprise a reference biometric template. The reference biometric template can then be transmitted to the querying user device.

The account access module 150J may comprise code that causes the processor 150A to identify an account and/or authenticate a user for accessing an account. For example, the account access module 150J may contain logic that causes the processor 150A to receive a device parameter and a new biometric template from a user device, identify a subset of accounts based on the device parameter, identify a reference biometric template for each account, compare the new biometric template with each reference biometric template, and identify a matching template. The user submitting the request can then be considered authenticated for accessing the identified account, and the matching template and corresponding user data (e.g., a user ID and account information) can be transmitted to the querying user device.

The account access module 150J can also comprise instructions for comparing a first and second biometric template. According to some embodiments, a first biometric template stored during enrollment may be compared to a second biometric template to authenticate a user. In one embodiment, two biometric templates may be considered a match if a predetermined number of data elements of the biometric templates match. For example, feature data for a user's fingerprint may be expressed as a string of characters representing a sequence of values. A match may be determined by comparing each corresponding characters between two strings and determining if a predetermined number of characters match. In another example, a biometric template of a user's face may be represented as a matrix of altered pixel values. A match may be determined by comparing each corresponding matrix element between two matrices and determining if a predetermined number of elements match. In other examples, a biometric template may be expressed as a series of bits, bytes in an array, etc. The account access module 150J may comprise instructions for comparing data elements of two biometric templates and determining a match if the data elements match within a predetermined threshold (e.g. at least 90% of characters matching between two strings). In some embodiments, the biometric templates can be compared by using less data than the entire biometric template, and the comparison process can use a "zero-knowledge proof" protocol in some embodiments.

The account access module 150J can comprise instructions for generating an authentication approval message indicating whether an account was identified based on a device parameter and/or biometric template. For example, the account access module 150J can comprise code for generating a message indicating that match occurred and that the user is authenticated for accessing the matching account. The authentication approval message can also include information about the matching account, such as a user ID, a reference biometric template, and any suitable data associated with or stored in the account. The authentication approval message may be then be sent to a user device.

Referring back to FIG. 1, the location 105 can be a space at which both the first user device 110 and second user device 120 may be located (at the same time or different times). For example, the location 105 can be a home, a restaurant, a building, a park, a street, a neighborhood, a city, a region, or any other suitable type of place. A shared location can be used to identify a reference biometric template and/or user account, as described on the following methods.

Figure 4A:
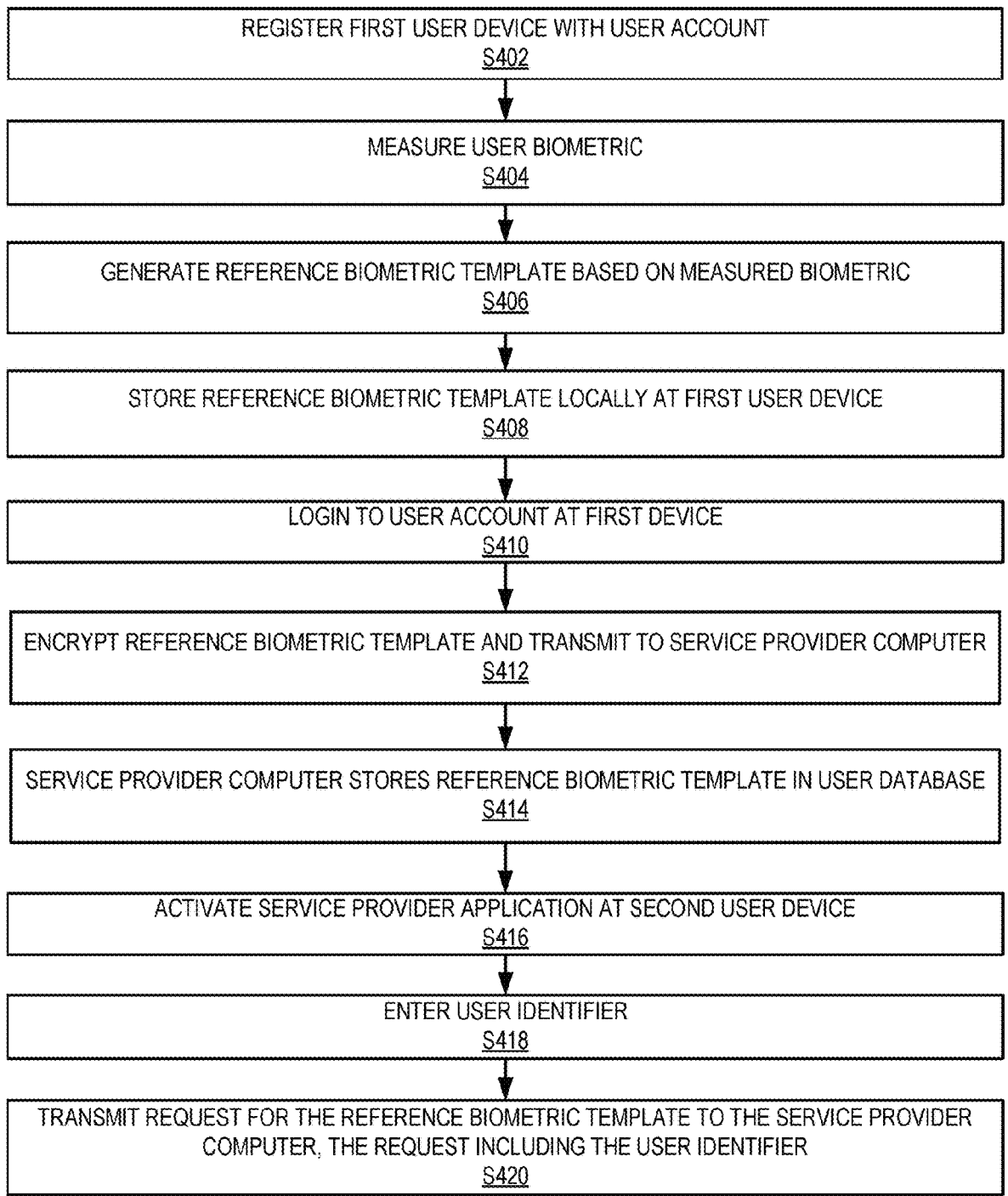
FIGS. 4A-4B shows a flow diagram illustrating a first method for leveraging biometric data from a first user device for biometric authentication at a second device, according to an embodiment of the invention.
Figure 4B:
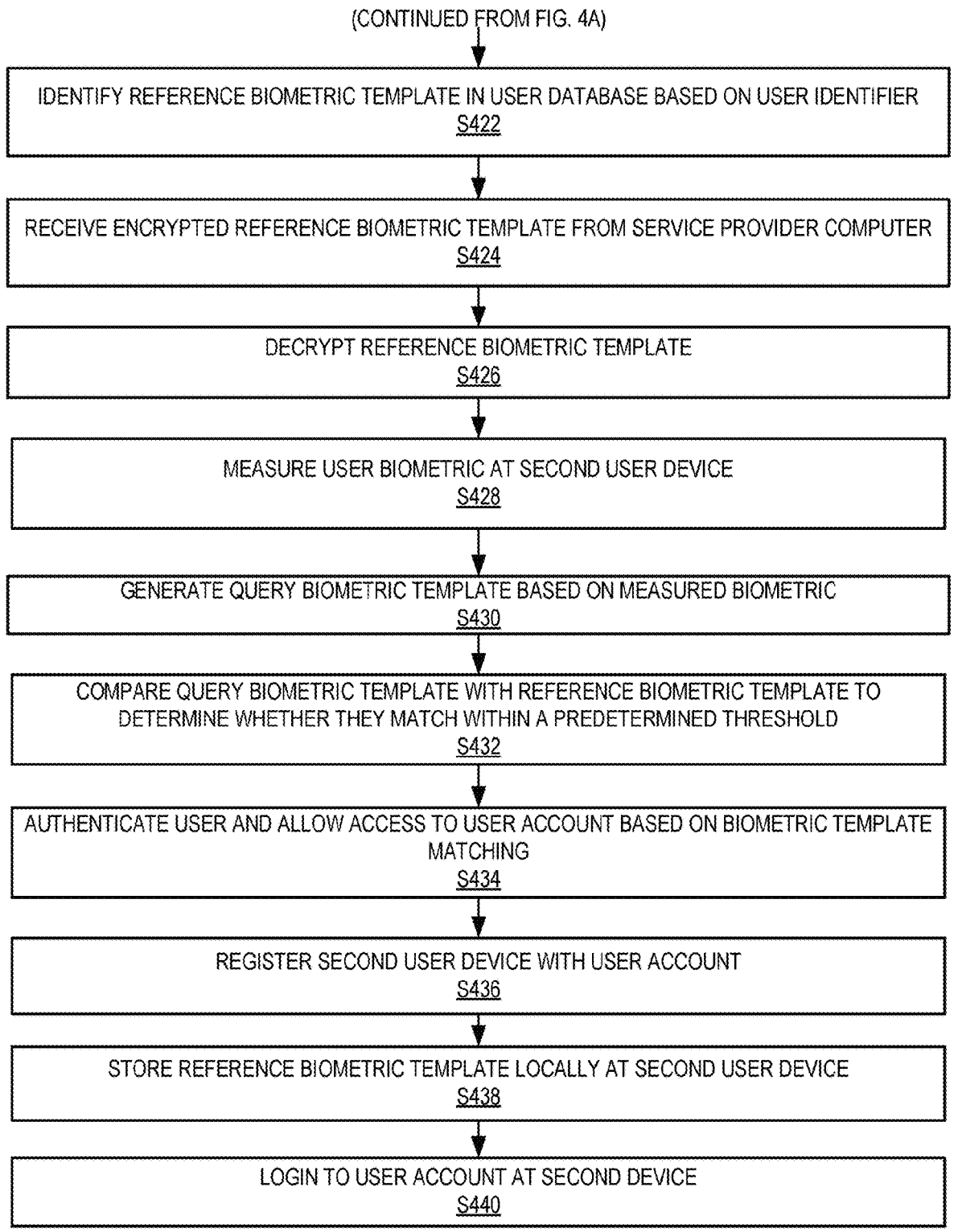

A first method 400 according to embodiments of the invention can be described with respect to FIGS. 4A-4B. Some elements in other Figures are also referred to. The steps shown in the methods 400, 500, and 600 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an Internet protocol (IP) address, or a uniform resource locator (URL). In some embodiments, a request or response may comprise a mix of different message types, such as both email and SMS messages.

For exemplary purposes, the following methods describe accessing an account (e.g., logging in to an email account, a bank account, or any other suitable type of user account). However, an account is one example of a dataset, and embodiments allow any other suitable type of dataset to be accessed. For example, a user can gain access to secure information at a server computer or at a user device, gain access to access credentials, or gain access to any other suitable type of data. Embodiments further allow other types of access to take place. For example, a user can also gain access to a restricted area, an event, a building, or any other suitable place or information. In some embodiments, a dataset can include information representing a user's privilege for accessing secure data or a secure space. Accordingly, accessing a dataset can include accessing credentials that can then be used for viewing secret information or entering a physical space.

Embodiments allow any of these types of datasets or other accessible items to be associated with and accessed using access credentials, such as a user ID and/or password. As described in detail below, access can also be obtained based on biometric authentication.

A user may wish to use multiple user devices for accessing a user account at a mobile application or an online service. The following method allows the user to transfer local authentication information from a first user device 110 to a second user device 120 in order to facilitate a seamless login process at the second user device 120.

At step S402, the user can register an association between the first user device 110 and the user account. For example, the user can login to the user account via the service provider application (or a website) at the first user device 110 by entering a user ID and password. The login process can automatically establish an association between the first user device 110 and the user account. This account association can be stored locally at the first user device 110. For example, the first user device 110 can store the user ID.

In some embodiments, the user can also register for biometric authentication services for the user account via the first user device 110. In order to register, the user may provide his or her biometric to the first user device 110 so that a biometric template of the user may be created. For example, at step S404, the first user device 110 can prompt the user to present his or her biometric to a biometric reader of the first user device 110. When the user presents the biometric, the first user device 110 can measure the biometric. Examples of biometrics can include a user's fingerprint, an image of the user, or a user's voice. Other examples may include the user's iris, the user's palm, or any other distinguishing feature of the individual. A biometric may be read using a biometric reader, which can include a fingerprint reader, front-facing camera, microphone, etc.

At step S406, the first user device 110 can generate a reference biometric template based on the measured biometric. For example, data can be assembled and stored that represents the biometric. The data may be either an analog or digital representation of the user's biometric.

In some embodiments, generating the reference biometric template can include identifying distinctive features of the measured biometric and then representing the distinctive features in digital form. For example, a data file may be created from the capture of electromagnetic signals generated by a biometric reader during sample reading, in which the signals may be binned into discrete bits according to a pre-defined resolution (i.e. as expressed by the number of pixels in an image or by the sample rate of an audio file). Software stored on the first user device 110 may then be used to identify features of the data file that can be used to accurately authenticate the user. For example, the user may be asked to present his or her biometric multiple times, and a mathematical model may be used to determine features that consistently appear. The features may be represented as a binary digital file, which may form the reference biometric template.

In some embodiments, generating a biometric template can be a two-step process. First, a first data file may be created based on the measurement. For example, this can be a complete image of a fingerprint or face, or a complete voice sample. Second, the first data file can be used to identify distinctive features of the biometric, and information about the distinctive features can be stored in a second data file. Embodiments of the invention allow either the first data file (e.g., a data file that represents the entire biometric) or the second data file (e.g., a data file that represents distinctive features or the biometric) to be used as a biometric template.

At step S408, the first user device 110 can store the reference biometric template locally. As a result, the first user device 110 can utilize the reference biometric template as a reference against which to compare future biometric templates (e.g., for future login attempts).

At step S410, the user can optionally login again to the user account via the service provider application at the first user device 110 (e.g., at a later time). Since the first user device 110 was registered with the user account (e.g., at step S402), the service provider application can automatically initiate a login process for this specific user account when activated. For example, the first user device 110 can automatically populate a user ID field with the user ID input at step S402. As a result, the user may only need to complete biometric authentication to access the account (e.g., the user may not have to re-enter a user ID and/or password). For example, the user's biometric can be measured again, a new biometric template can be generated based on the new biometric measurement, and the new biometric template can be compared with the reference biometric template. If the new biometric template matches the reference biometric template, the user can be authenticated and account access can be granted.

At step S412, the first user device 110 can transmit the reference biometric template to the application service provider computer 150. The first user device 110 can also transmit the user ID and/or any other suitable account information. In some embodiments, the first user device 110 can encrypt the reference biometric template before transmitting to the application service provider computer 150. For example, the reference biometric template can be encrypted using a public key associated with the application service provider computer 150.

At step S414, the application service provider computer 150 can store a copy of the reference biometric template in a user database. For example, the reference biometric template can be associated with the user ID (or other suitable account information) and stored in a database of biometric templates. In some embodiments, the application service provider computer 150 can decrypt the reference biometric template before storing (e.g., using a corresponding private key).

At step S416, the user can activate the service provider application (or access a service provider website) via the second user device 120. For example, the user may typically access a mobile banking account via a mobile banking application on the first user device 110 (e.g., a smartphone). However, this time, the user may wish to access the mobile banking account via a mobile banking application on a different device (e.g., a tablet, or a new smartphone).

At step S418, the user can attempt to login to the user account via the second user device 120. However, unlike the first user device 110, the second user device 120 may not be registered with the user account. Thus, the second user device 120 may not have locally stored user account information such as the user ID or the reference biometric template. Accordingly, the user can first identify the user account by entering a user ID or other suitable identifier.

The second user device 120 can then proceed to obtain the reference biometric template from the application service provider computer 150. For example, at step S420, the second user device 120 can transmit a request for the reference biometric template to the application service provider computer 150, the request including the user ID (e.g., entered by the user at step S418).

At step S422, the application service provider computer 150 can identify the reference biometric template (and any other suitable account information) from a user database based on the received user ID. The application service provider computer 150 can then transmit the reference biometric template and any other suitable information to the second user device 120. In some embodiments, the application service provider computer 150 can encrypt the reference biometric template before sending to the second user device 120. For example, the reference biometric template can be encrypted using a public key associated with the instance of the service provider application at the second user device 120.

At step S424, the second user device 120 can receive the reference biometric template from the application service provider computer 150. In some embodiments, at step S426, the second user device 120 can also decrypt the reference biometric template (e.g., using a corresponding private key).

Having received the reference biometric template, the second user device 120 can now be capable of local biometric authentication. In some embodiments, the second user device 120 can then prompt the user to provide a biometric in order to access the account associated with the input user ID. In response, the user can present his or her biometric to a biometric reader of the second user device 120.

At step S428, the second user device 120 can measure the biometric. In some embodiments, the user can perform steps to have their biometric read (e.g., place their finger on the fingerprint sensor, speak into a microphone, etc.) in a same or similar manner as in step S404.

At step S430, the second user device 120 can generate a new biometric template based on the newly measured biometric, similar to step S406. For example, data can be assembled and stored that represents the biometric. The data may be either an analog or digital representation of the user's biometric. In some embodiments, as explained above, generating the new biometric template can include identifying distinctive features of the measured biometric and then representing the distinctive features in digital form.

The new biometric template can then be used as a query biometric template for accessing the user account. For example, the new biometric template can be used to inquire for account access. If the query biometric template matches the reference biometric template, access to the user account can be granted. The query biometric template can alternatively be referred to as a second biometric template, an input biometric template, a current biometric template, or a new biometric template.

At step S432, the second user device 120 can locally compare the new biometric template (e.g., being used as a query biometric template) with the reference biometric template in order to determine whether they match (e.g., according to a predetermined threshold). In one embodiment, this may be done by comparing each data element of the query biometric template to a corresponding data element of the reference biometric template. Two templates may be considered a match if less than a predetermined number of data elements differ. For example, the templates may be expressed as a string of equal length, and the second user device 120 may compare each corresponding character (first, second, third, etc.) from each string to one another, and may determine a match if less than 10 characters differ.

At step S434, if the query biometric template is determined to match the reference biometric template, the user can be considered authenticated, and the service provider application at the second user device 120 can allow access to the user account (e.g., or another type of dataset such as secret information, access credentials for entering a physical space, home security controls, etc.). In some embodiments, if the query biometric template does not adequately match the reference biometric template, the authentication can fail and the login attempt can be rejected. Also, the reference biometric template can be erased from the second user device 120.

At step S438, the second user device 120 can be registered with the user account (e.g., in response to the successful login). For example, the second user device 120 can locally store the user ID and any other suitable account information. At step 3438, the second user device 120 can also locally store the reference biometric template (e.g., as associated with the user ID).

At step S440, at a later time, the user can optionally activate the service provider application again to login to the user account using the second user device 120. Since the second user device 120 was registered with the user account (e.g., at step S436), the service provider application can automatically initiate a login process for this specific user account when activated. For example, the second user device 120 can automatically populate a user ID field with the user ID input at step S418. As a result, the user may only need to complete biometric authentication to access the account (e.g., the user may not have to re-enter a user ID and/or password). The user's biometric can be measured again (e.g., measured for the third time), a current biometric template can be generated based on the new biometric measurement, and the current biometric template can be compared with the reference biometric template. If the current biometric template matches the reference biometric template, the user can be authenticated and account access can be granted.

Accordingly, embodiments advantageously allow for a reference biometric template stored locally at a first user device to be backed up at a server computer. When the user attempts to access the account at a second user device, the server computer can provide the reference biometric data to the second user device. This allows the second user device to authenticate the user based on newly input biometric data (e.g., a second biometric template), as if the user were logging in at the first user device. Thus, embodiments allow login and access procedures that are normally localized to a single device to be used at other devices, thereby improving account accessibility and login security (e.g., because secure biometrics can be used at more devices).

In some embodiments, the comparison of the query biometric template with the reference biometric template described at step S432 can instead take place at the application service provider computer 150. For example, instead of sending the reference biometric template to the second user device 120, the second user device 120 may send the query biometric template to the application service provider computer 150. The application service provider computer 150 can then compare the reference biometric template with the query biometric template in order to determine whether they match (e.g., according to a predetermined threshold), and then inform the second user device 120 whether or not there was a match.

Step S422 above describes identifying the reference biometric template based on the user ID input at the second user device 120 by the user at step S418. However, embodiments allow the application service provider computer 150 to identify the reference biometric template based on any other suitable information. For example, the user can input, at the second user device 120, a phone number or other identifier associated with the first user device 110. The second user device 120 can send this information to the application service provider computer 150, which can then identify the reference biometric template based on the first user device 110 identifier. Additional examples of information that can be associated with and used to identify the reference biometric template include an email address, a name, a second reference biometric template, a home address, a passphrase, a PIN, and/or any other suitable information.

Figure 5A:
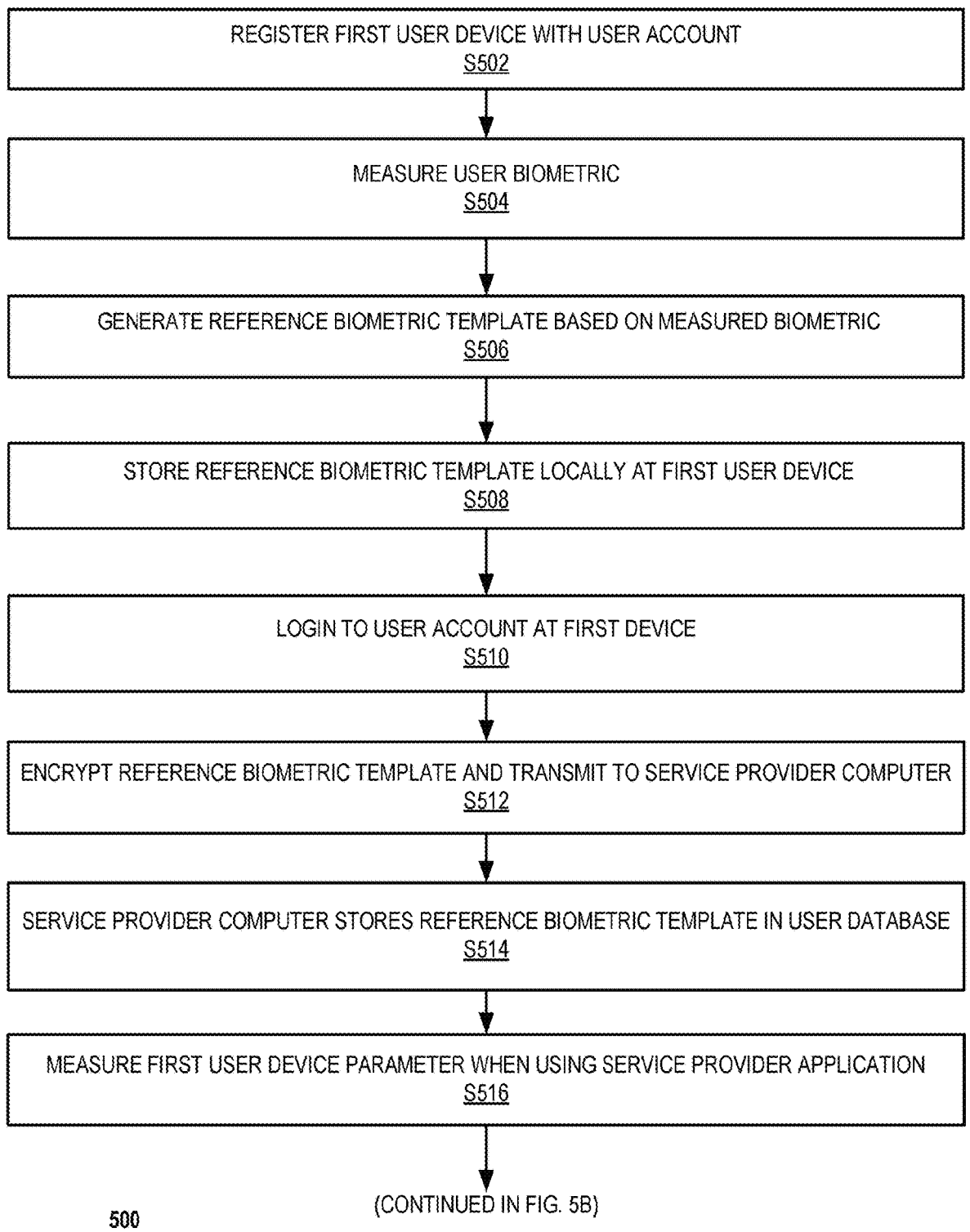
FIGS. 5A-5C shows a flow diagram illustrating a second method for leveraging biometric data from a first user device for biometric authentication at a second device, according to an embodiment of the invention.
Figure 5B:
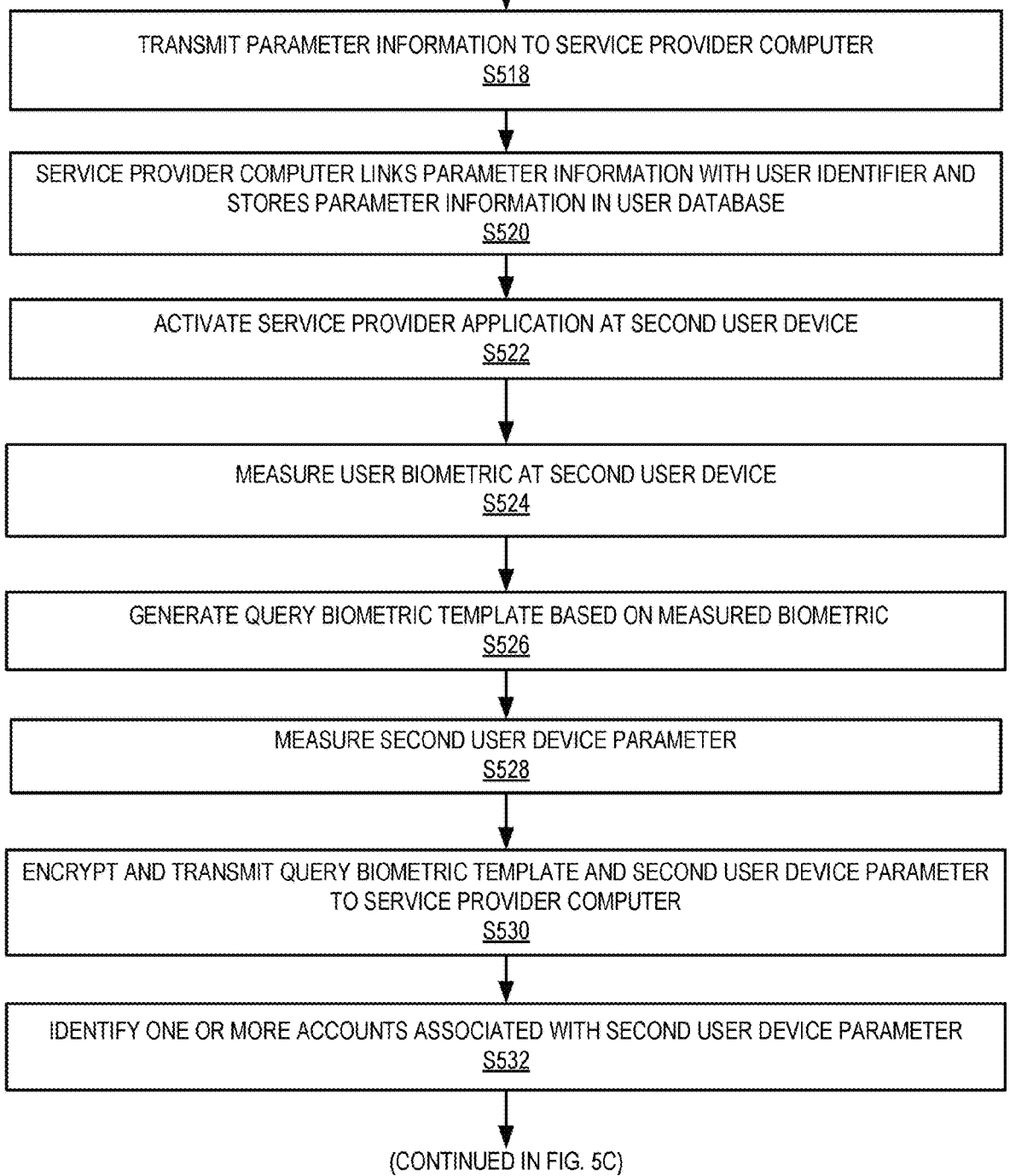
Figure 5C:
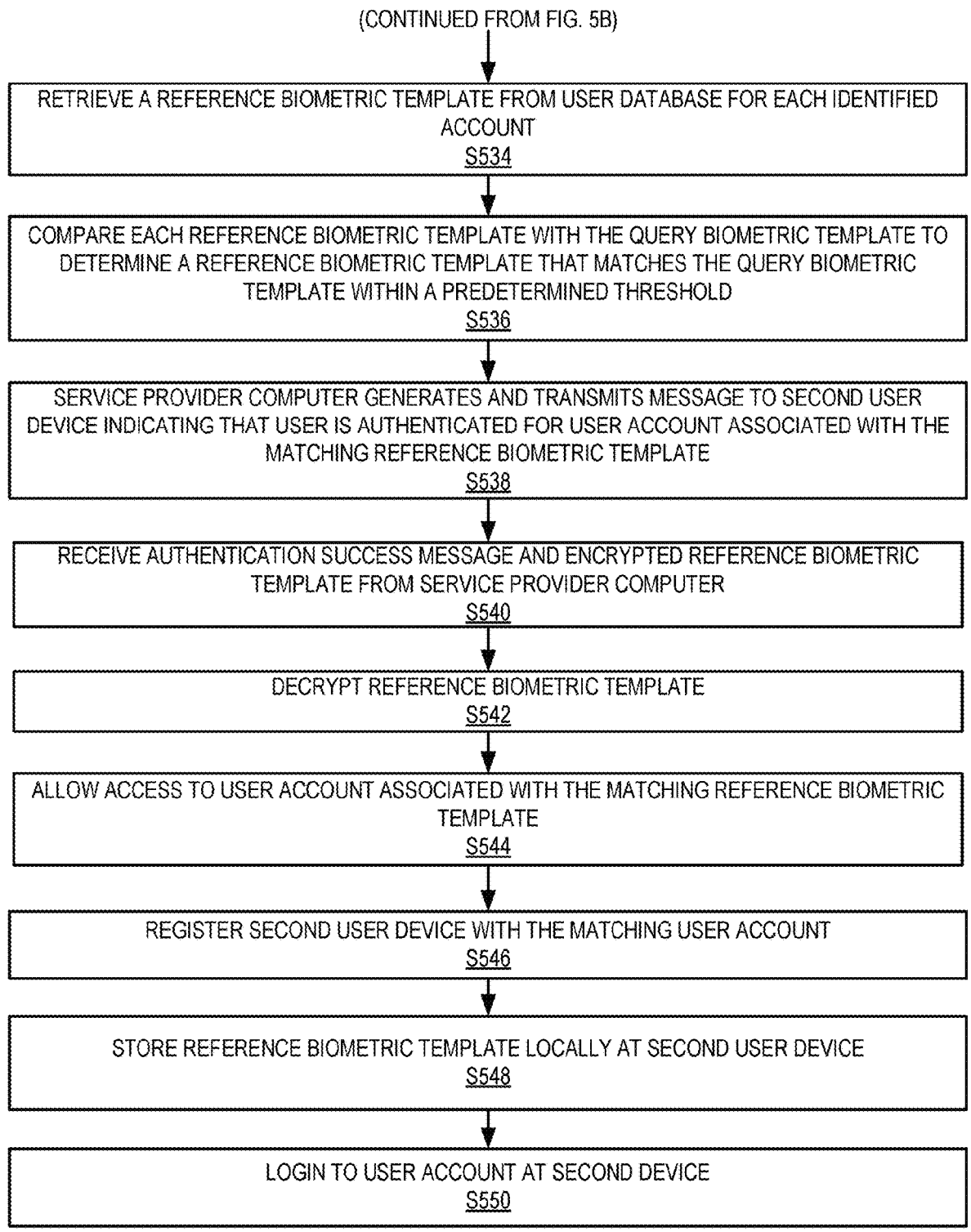

A second method 500 according to embodiments of the invention can be described with respect to FIGS. 5A-5C. The method 500 provides a further improvement of identifying potential user accounts based on a user device parameter value (e.g., a device location or login time). As a result, the user can initially login at the second user device 120 without having to enter a user ID.

FIG. 5A illustrates steps S502-S514. In some embodiments, these steps may be the same as or substantially similar to steps S402-S414 in FIG. 4A, and the descriptions of those steps are not repeated in the description of FIGS. 5A-5C.

Then, at step S516, the first user device 110 can measure a current device parameter value when the first user device 110 is being used to access the user account (e.g., via the service provider application or a service provider website). For example, the first user device 110 can measure a current location, time, IP address, and/or any other suitable information related to the current state of the user device. For exemplary purposes, the location will be used as the parameter for the remainder of this flow description.

In some embodiments, the first user device 110 may can measure the current location using a GPS system. For example, a GPS unit in the first user device 110 can provide a current latitude, longitude, and/or elevation of the first user device 110. This can be accomplished by measuring the distance between the first user device 110 and one or more GPS satellites, and then using known GPS satellite positions to triangulate the relative position of the first user device 110. In some embodiments, similar triangulation can be performed using cellular towers instead of GPS satellites. Further, a mapping application can provide a street address of the first user device 110 based on the determined coordinates.

In some embodiments, the current location of the first user device 110 can also or instead be described by current first user device 110 IP address, a WI-FI network currently being accessed, and/or any other suitable location information.

In further embodiments, the first user device 110 can identify multiple locations (e.g., across multiple login sessions). For example, the user may login to the user account when at home, at work, and at a certain café, and the first user device 110 can store information about each of these locations.

At step S518, the first user device 110 can transmit the measured parameter value to the application service provider computer 150. For example, first user device 110 can send coordinates or other location data associated with account login instances to the application service provider computer 150 along with information about the account (e.g., the user ID).

At step S520, the application service provider computer 150 can store the parameter value (e.g., location coordinates) in a user database. For example, the application service provider computer 150 can record an association between the parameter value and the user ID, and store the parameter value in a database of user history data. The stored parameter can be used as a first parameter value, against which future parameter values (e.g., a second parameter value) can be compared.

Then, the user can activate the service provider application via the second user device 120 at step S522, which can be the same as or similar to step S416. In some embodiments, the service provider application can, upon activation, prompt the user to provide a biometric. In response, the user can present his or her biometric to a biometric reader of the second user device 120.

Then, the second user device 120 can measure the biometric at step S524, which can be the same as or similar to step S428. Also, the second user device 120 can generate a new biometric template based on the newly measured biometric at step S526, which can be the same as or similar to step S430.

At step S528, the second user device 120 can measure a current device parameter value of the second user device 120. For example, the second user device 120 can measure a current location in a similar manner as step S516 (except at the second user device 120 instead of the first user device 110). This can be considered a second parameter value, which can be compared with the stored first parameter value. In some embodiments, the service provider application can, upon activation, cause the second user device 120 to measure the current device parameter value of the second user device 120.

At step S530, the second user device 120 can transmit the new biometric template (to be used as a query biometric template), the current second user device 120 parameter value (e.g., the second parameter value), and/or any other suitable information to the application service provider computer 150. In some embodiments, the second user device 120 can encrypt the query biometric template and/or the current second user device 120 location before transmitting to the application service provider computer 150. For example, the information can be encrypted using a public key associated with the application service provider computer 150. In some embodiments, the service provider application can, upon activation, automatically transmit the query biometric template and the current second user device 120 parameter value (e.g., the second parameter value) once they are obtained.

In some embodiments, it is possible that other accounts have been accessed by other user devices at the current location of the second user device 120. As a result, the application service provider computer 150 may associate the current location of the second user device 120 with several other accounts and/or devices. In one example, the current location of the second user device 120 is the user's home, and the user's home may be associated with the user account (e.g., the association may have been established at step 9520). However, the user's home may also be associated with other accounts, such as a spouse's account, and a child's account. In another example, the current location may be a café, an apartment building, a college dorm, or any other public place which may be associated with the user account as well as many (e.g., 5, 10, 25, 50, 100, or 1000) other accounts.

Accordingly, at step S532, the application service provider computer 150 can identify one or more accounts based on the second parameter value (e.g., the current parameter value of the second user device 120). For example, if the current location of the second user device 120 is the user's home, the application service provider computer 150 may identify three accounts (e.g., user account, spouse account, and child account). Alternatively, if the current location of the second user device 120 is a public place, the application service provider computer 150 may identify many other accounts.

In some embodiments, each account in the identified subset of accounts can be selected if it is associated with a location that is within a certain predefined range of the current location of the second user device 120. For example, locations (e.g., GPS coordinates) within 10 feet, 20 feet, 50 feet, 100 feet, or within any other suitable distance of the current location of the second user device 120 may be considered sufficiently close. In another example, an account may be included in the subset of accounts if it is associated with a location that is within the same building, structure, neighborhood, park, city, or district (or any other suitable region) as the current location of the second user device 120.

In some embodiments, the application service provider computer 150 can also perform risk processing in order to determine whether the current login attempt is likely legitimate or fraudulent. For example, if there have recently been a large number of unsuccessful attempts to login from the current location, or many attempts to access a certain user account associated with the current location, the login attempt may be rejected.

At step S534, the application service provider computer 150 can retrieve a reference biometric template (e.g., from a user database) for each account identified in step S532. For example, 50 accounts may have been identified in step S532, so the application service provider computer 150 may retrieve 50 corresponding reference biometric templates. This subset of templates can be referred to as candidate templates, as each template can be considered a candidate that may match with the query biometric template.

At step S536, the application service provider computer 150 can compare the query biometric template (e.g., received in step S530) with each of the identified reference biometric templates, and thereby determine whether the query biometric template matches any of the identified reference biometric templates according to a predetermined threshold. Each comparison can take place similarly to the biometric template comparison described at step S432. If the query biometric template is determined to match one of the identified reference biometric templates, the user can be considered authenticated for the account associated with the matching biometric template. Accordingly, in some embodiments, an account (e.g., or other suitable dataset) can be identified based on a query biometric template and/or a second parameter value, and not based on a user identifier.

At step S538, the application service provider computer 150 can generate and transmit a message to the second user device 120 indicating that the user is authenticated for the user account associated with the matching reference biometric template. The message can include the user ID, and any other suitable information associated with the determined user account (e.g., or other suitable type of dataset, or a dataset itself).

The application service provider computer 150 can also transmit the matching reference biometric template to the second user device 120. In some embodiments, the application service provider computer 150 can encrypt the reference biometric template before sending to the second user device 120. For example, the reference biometric template can be encrypted using a public key associated with the instance of the service provider application at the second user device 120.

At step S540, the second user device 120 can receive the authentication approval message and/or reference biometric template from the application service provider computer 150. In some embodiments, at step S542, the second user device 120 can also decrypt the reference biometric template (e.g., using a corresponding private key).

At step S544, the service provider application at the second user device 120 (or a service provider website) can allow access to the user account (e.g., or any other suitable type of dataset) associated with the matching reference biometric template (e.g., in response to receiving the authentication approval message).

Then, the second user device 120 can be registered with the user account at step S546, which can be the same as or similar to step S436. Also, the second user device 120 can locally store the reference biometric template at step S548, which can be the same as or similar to step S438. Additionally, the user can again login to the user account using the second user device 120 at step S550, which can be the same as or similar to step 3440.

In other embodiments, steps 3524-S536 may occur in a different order and manner. For example, the application service provider computer 150 may first identify the subset of accounts based on the location data. Reference biometric data for each account can then be identified as well as a biometric modality (or biometric type) common to the accounts (e.g., fingerprint, iris scan, etc.). Having identified the biometric modality, the application service provider computer 150 may prompt the second user device 120 to measure a biometric of the specific identified modality. The user may then allow the biometric of the specified modality to be measured, and the second user device 120 may create and transmit the query biometric template to the application service provider computer 150. At this point, the application service provider computer 150 can proceed to identify the correct user account from the subset of accounts by comparing the newly received query biometric template with the different reference biometric templates (e.g., because the query biometric template has the same modality as the reference biometric templates). In other words, step S524 can take place after step S532, such that the correct biometric modality can be utilized for the new biometric template.

In further embodiments, between steps S522 and S524, the second user device 120 can prompt the user to indicate what type of biometric modality was used at step S504. The second user device 120 can then prompt the user to provide a biometric of that same modality. In alternative embodiments, the modality can be automatically selected for the user (e.g., based on a predicted modality), and the second user device 120 can automatically prompt the user to provide that type of biometric. Then, the query biometric template can be generated and sent to the application service provider computer 150 and used to identify the user account from the subset of accounts, as described above.

In some embodiments, instead of the application service provider computer 150 comparing the query biometric template with the reference biometric templates (e.g., as described for step S536), the application service provider computer 150 can send the reference biometric templates to the second user device 120. Then, the second user device 120 can perform the comparing and matching step locally.

In some embodiments, there may be a large number of accounts associated with the current device location (e.g., as described in step S532). Accordingly, in addition to comparing biometric data, further steps can be taken to identify the correct user account from among the group of accounts in order to prevent a false positive account selection. For example, the user may be prompted to enter the last four digits of a phone number associated with the first user device 110, or the user may be prompted to identify an image associated with the account, and this information can be used to further filter the identified group of accounts.

In some embodiments, as mentioned above, other user-behavior patterns or parameters associated with the user or first user device 110 can be used to identify the user account (e.g., in addition to or instead of location information). For example, information about normal times that the user accesses the account can be tracked (e.g., 2:30 PM and 10:00 AM), and the time of attempted access at the new device can be compared with these normal times in order to find a match (e.g., within a 30 minute time window). Other suitable behaviors and parameter values can also be tracked, such as login frequency, day of the week, the order in which different applications are opened, IP address, language, time zone, device operating system, user device metadata, etc.

Additionally, in some embodiments, the user account or a subset of accounts can be identified based on a plurality of parameters (e.g., one or more of the above-listed parameters). For example, the first user device 110 can measure and send a plurality of parameter values (e.g., a time, a location, and any other suitable type of parameter value) at steps S516-S518, the second user device 120 can also measure and send a plurality of parameter values at steps S528-S530, and the application service provider computer 150 can identify one or more accounts based on the plurality of parameter values associated the second user device 120. For example, each account in the identified subset of accounts can be selected if it is associated at least one parameter that is within a certain predefined range of one of the parameters of the second user device 120. Alternatively, in some embodiments, each account in the identified subset of accounts can be selected if it is associated a plurality of parameters that are each within a certain predefined range of each of the plurality of parameters of the second user device 120.

In some embodiments, at step S536, if there are multiple reference biometric templates that match the query biometric template, the application service provider computer 150 can identify the best match. Alternatively, the application service provider computer 150 can reject login attempt, as multiple matches can be indicative of low quality biometric data. Additionally, if the query biometric template does not adequately match any of the reference biometric templates, the authentication can fail and the login attempt can be rejected.

In some embodiments, steps S512 and S518 can happen at the same time, or can happen at other suitable times. For example, the first user device 110 can send both the local reference biometric template and the tracked parameter information to the service provider computer S534 at the same time.

Accordingly, embodiments advantageously allow for a reference biometric template stored locally at a first user device to be backed up at a server computer. When the user attempts to access the account at a second user device (or access a place or other information via the second user device), the server computer can automatically identify a set of accounts possibly associated with the user based on the current device location. The correct account can be identified from the set of accounts based on newly input biometric data (e.g., by comparing a second biometric template with a reference biometric template from each account). A biometric template match can also serve as authentication for accessing the identified account. This allows the second user device to authenticate the user based on a new biometric template and without requiring the user to input a user identifier or password, as if the user were logging in at the registered first user device. Thus, the user can login normally even when using a new device, provided the user is at a familiar location. Accordingly, embodiments allow login and access procedures normally localized to a single device to be used at other devices, thereby improving account accessibility and login security (e.g., because secure biometrics can be used in more places).

Embodiments also advantageously improve access speed and security because a subset of accounts can be identified based on a user device location. For example, if only biometric data (and not location information) was used to identify the user account, the account would have to be selected from among all accounts (e.g., potentially thousands or millions of accounts). Comparing a new query biometric template with reference biometric templates from every account would take a long time. Accordingly, using location to identify a subset of accounts can reduce the time and computer power needed to locate the correct user account, as the query biometric template can instead be compared with a small number (e.g., 3, 10, 25, 100, or 1000) of reference biometric templates from the subset of accounts.

Further, biometric authentication processes can sometimes result in false-positive matches. A large-scale search for a biometric template match would likely cause an increase in false-positive matches. A query biometric template is more likely to find single, correct match when compared with a small set of reference biometric templates. Thus, by only comparing a query biometric template with reference biometric templates from the subset of accounts, the chance of a false-positive match is reduced. Accordingly, using a location (or other parameter) to first identify a subset of user accounts enables the safe use of biometric data for identifying a single account. If the subset is not first found, it can be unsafe to use biometric data for account-identification purposes (e.g., due to a higher error rate).

Figure 6A:
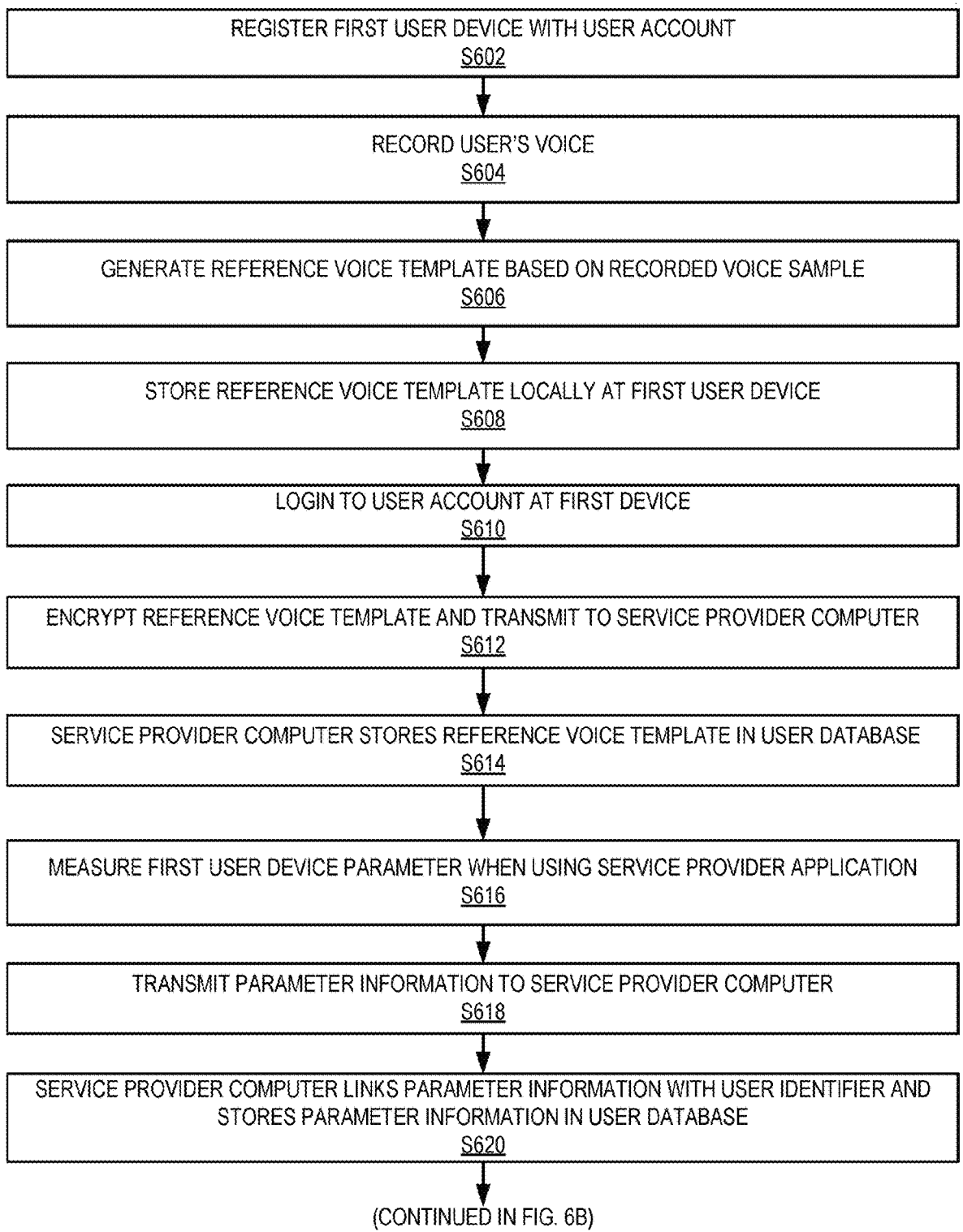
FIGS. 6A-6C shows a flow diagram illustrating a third method for leveraging biometric data from a first user device for biometric authentication at a second device, according to an embodiment of the invention.
Figure 6B:
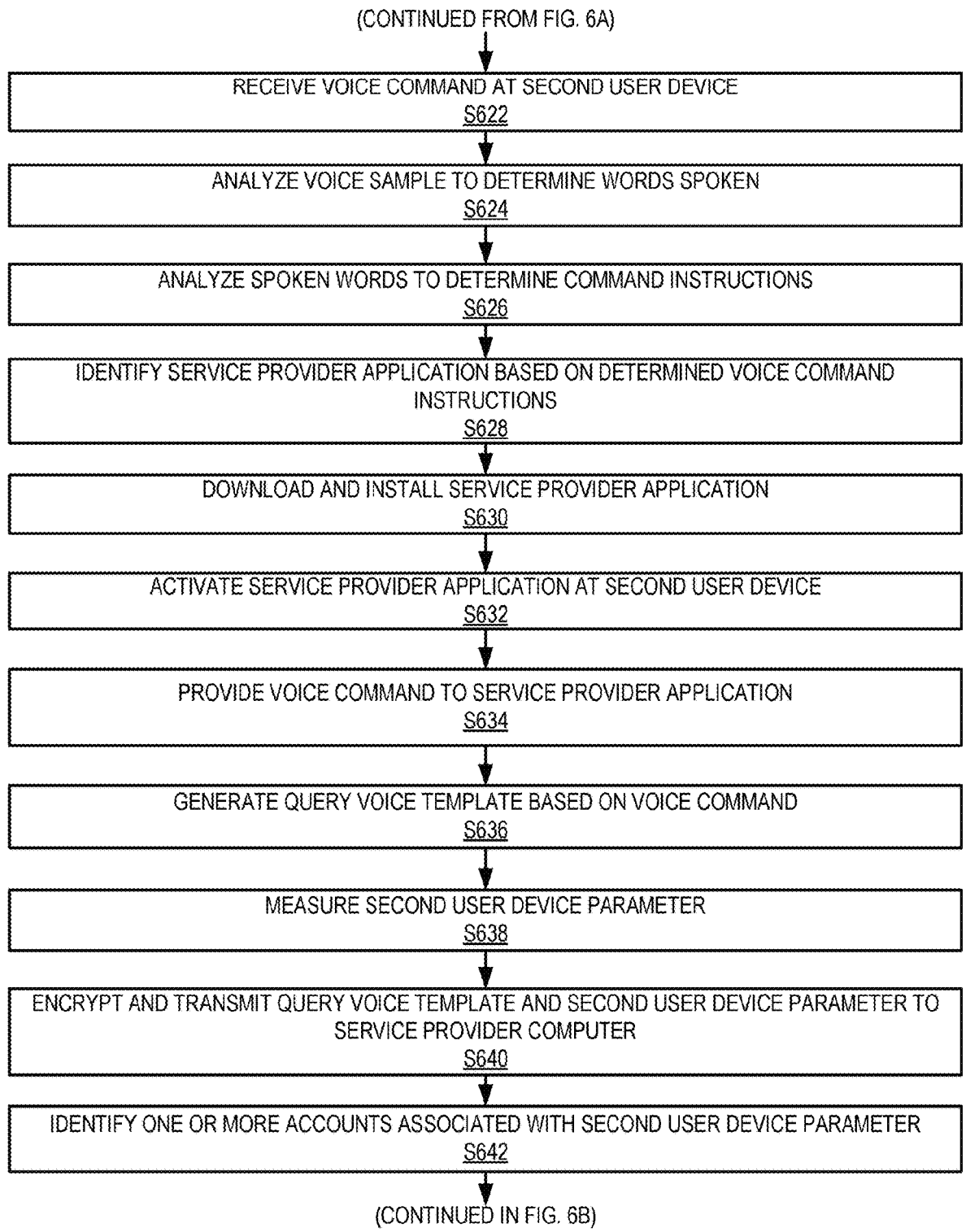
Figure 6C:
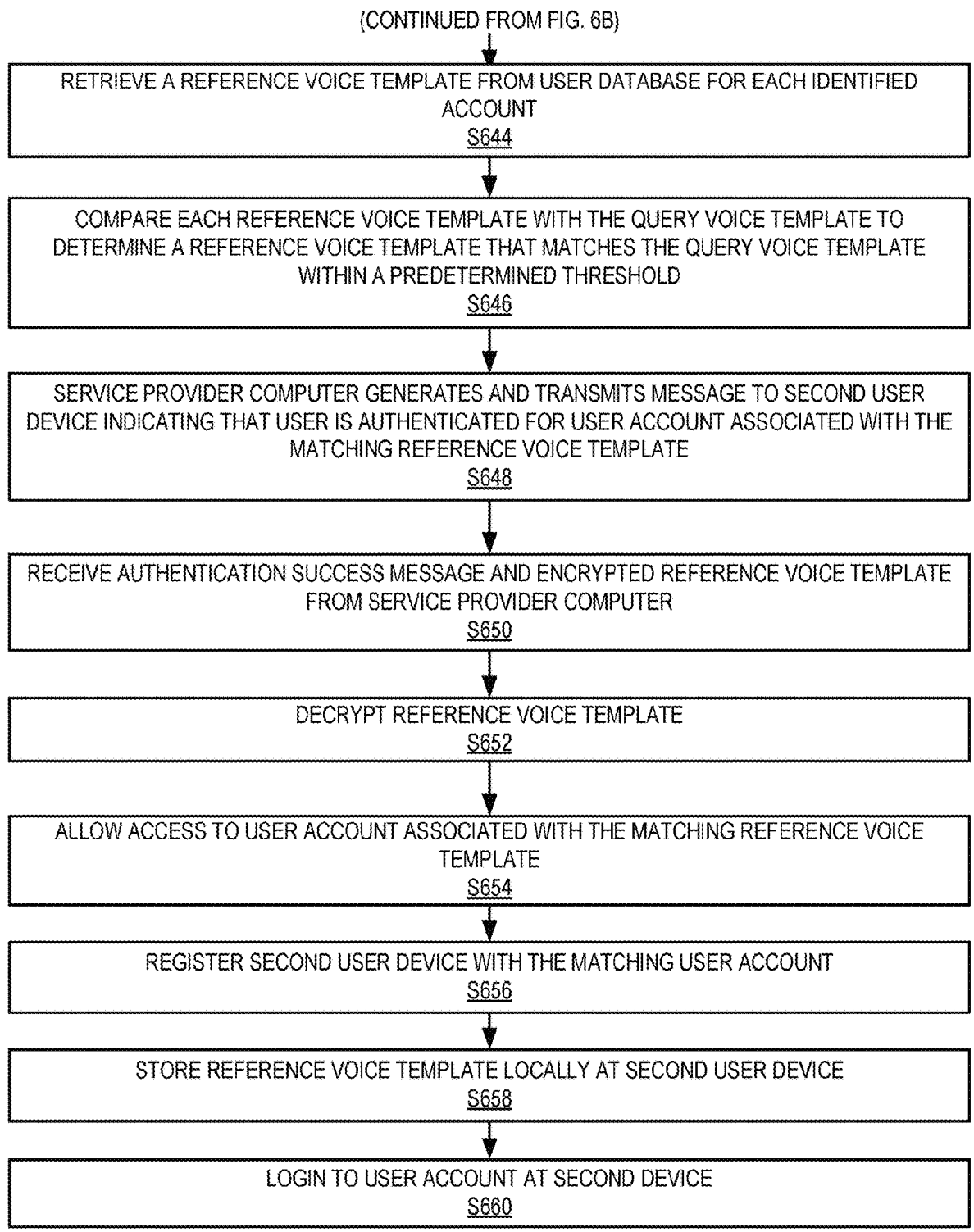

A third method 600 according to embodiments of the invention can be described with respect to FIGS. 6A-6C. The method 600 provides a further improvement of installing and/or activating the service provider application via a voice command, and using the same voice command for as a biometric input for account identification and user authentication. As a result, the user can initially download, install, activate, and login using the second user device 120 for the first time with a single voice command (e.g., without having to enter a user ID or password).

FIG. 6A illustrates steps S602-S614. In some embodiments, these steps may be the same as or substantially similar to steps S402-S414 in FIG. 4A, and the descriptions of those steps are not repeated in the description of FIGS. 6A-6C. However, steps S602-S614 more specifically involve recording a user's voice at the first user device 110 (e.g., by speaking one or more words or phrases into a microphone) as a first biometric measurement, and generating and storing a reference voice template (e.g., as opposed to other types of biometrics).

FIG. 6A then illustrates steps S616-S620. In some embodiments, these steps may be the same as or substantially similar to steps S516-S520 in FIGS. 5A and 5B, and the descriptions of those steps are not repeated in the description of FIGS. 6A-6C.

At step S622, the user can speak a voice command to the second user device 120 for accessing the service provider application (or a service provider website). For example, the user may typically access a mobile banking account via a mobile banking application on a the first user device 110 (e.g., a smartphone). However, this time, the user may wish to access the mobile banking account via a mobile banking application on a different device (e.g., a tablet, or a new smartphone).

Instead of manually locating the service provider application (e.g., in a digital application storefront), manually selecting and installing the service provider application, and manually activating the service provider application, the user can issue a voice command so that the second user device 120 performs one or more of these tasks.

In one example, the user can activate a voice command feature on the second user device 120 (e.g., by pressing a button or icon, or by saying a phrase that activates a voice command module). The user can then speak a command (e.g., by speaking into a microphone) such as "open banking application," or any other suitable voice command for activating any suitable application. The second user device 120 can measure and/or record the user's voice.

At step S624, the second user device 120 can analyze the user's speech to determine the words spoken by the user. For example, the second user device 120 can determine each word that was spoken based on the audio waveforms and pauses in the recorded voice sample. The second user 120 device can also separate the words into phrases and/or sentences.

At step S626, the second user device 120 can analyze the words and/or phrases to determine the command instructions. For example, the second user device 120 can, based on the identified words, determine that the user would like to download, install, activate, and/or login to a certain service provider application (e.g., a banking application).

At step S628, the second user device 120 can identify the service provider application based on the determined command instructions. For example, the second user device 120 can determine whether the service provider application is already installed and available on the second user device 120. If the service provider application is not yet installed, the second user device 120 can locate the service provider application in a digital application storefront.

In other embodiments, if the service provider application is already installed, the second user device 120 can proceed to step S632 and activate the service provider application.

At step S630, the second user device 120 can automatically download the service provider application (e.g., from the application storefront) in response to the voice command instructions. The second user device 120 can also install the service provider application (e.g., based on the voice command).

At step S632, the second user device 120 can activate the service provider application based on the voice command instructions. Thus, based on a single voice command, the second user device 120 can identify, download, Install, and/or activate the service provider application such that the user does not have to manually perform one or more of these steps. With the service provider application activated and running on the second user device 120, the second user device 120 and/or the service provider application can automatically proceed to identify the user's account and authenticate the user.

At step S634, the second user device 120 can provide the recorded voice command to the service provider application, such that the voice command (e.g., an audio file including a recording of the user's voice command) can be used for biometric authentication.

Once activated, the service provider application can initiate a login process. In some embodiments, the service provider application can automatically initiate a login process when activated. Alternatively, the service provider application can initiate a login process in response to receiving a voice sample, or in response to an indication from the second user device 120 voice command module.

Then, the second user device 120 can generate a new voice template (e.g., a biometric template of a voice recording) based on the voice command at step S636, which can be the same as or similar to step S430. In some embodiments, the voice command can be used as the new voice template without making any changes to the received audio file. In other embodiments, generating the new voice template can include identifying distinctive features of the user's voice in the voice command audio file and then representing the distinctive features in digital form. The new voice template can then be used as a query voice template for identifying and/or accessing the user account.

At step S638, which can be the same as or similar to step S528 in FIG. 5B, the second user device 120 can measure a current device parameter of the second user device 120.

At step S640, which can be the same as or similar to step S530 in FIG. 5B, the second user device 120 can transmit the new voice template (e.g., to be used as a query voice template for accessing an account), the current second user device 120 location, and/or any other suitable information to the application service provider computer 150.

At step S642, which can be the same as or similar to step S532 in FIG. 5B, the second user device 120 can identify a subset of accounts associated with the one or more current second user device 120 parameters.

At step S644, which can be the same as or similar to step S534 in FIG. 5C, the application service provider computer 150 can retrieve a reference voice template for each of the identified accounts.

At step S646, which can be the same as or similar to step 3536 in FIG. 5C, the application service provider computer 150 can compare the query voice template with each of the identified reference voice templates to find a match.

At step S648, which can be the same as or similar to step 3538 in FIG. 5C, the application service provider computer 150 can generate and transmit a message to the second user device 120 indicating that user is authenticated for the user account associated with the matching reference voice template, as well as transmit the matching reference voice template.

At step S650, which can be the same as or similar to step S540 in FIG. 5C, the second user device 120 can receive the authentication approval message and/or reference biometric template from the application service provider computer 150. At step S652, which can be the same as or similar to step S542 in FIG. 5C, the second user device 120 can decrypt the reference biometric template (e.g., using a corresponding private key).

At step S654, which can be the same as or similar to step S544 in FIG. 5C, the service provider application at the second user device 120 can allow access to the user account (e.g., or any other suitable type of dataset).

Then, the second user device 120 can be registered with the user account at step S656, which can be the same as or similar to step S436. Also, the second user device 120 can locally store the reference voice template at step S658, which can be the same as or similar to step S438. Additionally, the user can again login to the user account using the second user device 120 at step S660, which can be the same as or similar to step S440.

Accordingly, embodiments of the invention advantageously allow for a single voice command to cause an application to be identified, downloaded, installed, and activated. The same voice command can further be used as a tool for identifying the correct user account from among a subset of accounts, and used to authenticate the user for accessing the identified account. As a result, with a single voice command, a user can gain access to a user account at a service provider application, even if the user has never accessed the user account or service provider application from that device before. Thus, the user may be able to skip a number of typically manual steps, such as downloading an application, activating an application, activating a voice authentication function, speaking an additional voice authentication phrase (since the voice command can also be used for authentication), and entering a user ID and password.

As mentioned above, embodiments of the invention allow sharing biometric data in order to access data, a user account, a physical space, or for completing biometric authentication for any other suitable purpose. Biometric data can be shared from one personal user device to another, or from one public access device to another. To provide another illustrative example, FIG. 7 shows a block diagram of a physical access system 700, according to an embodiment of the invention.

Figure 7:
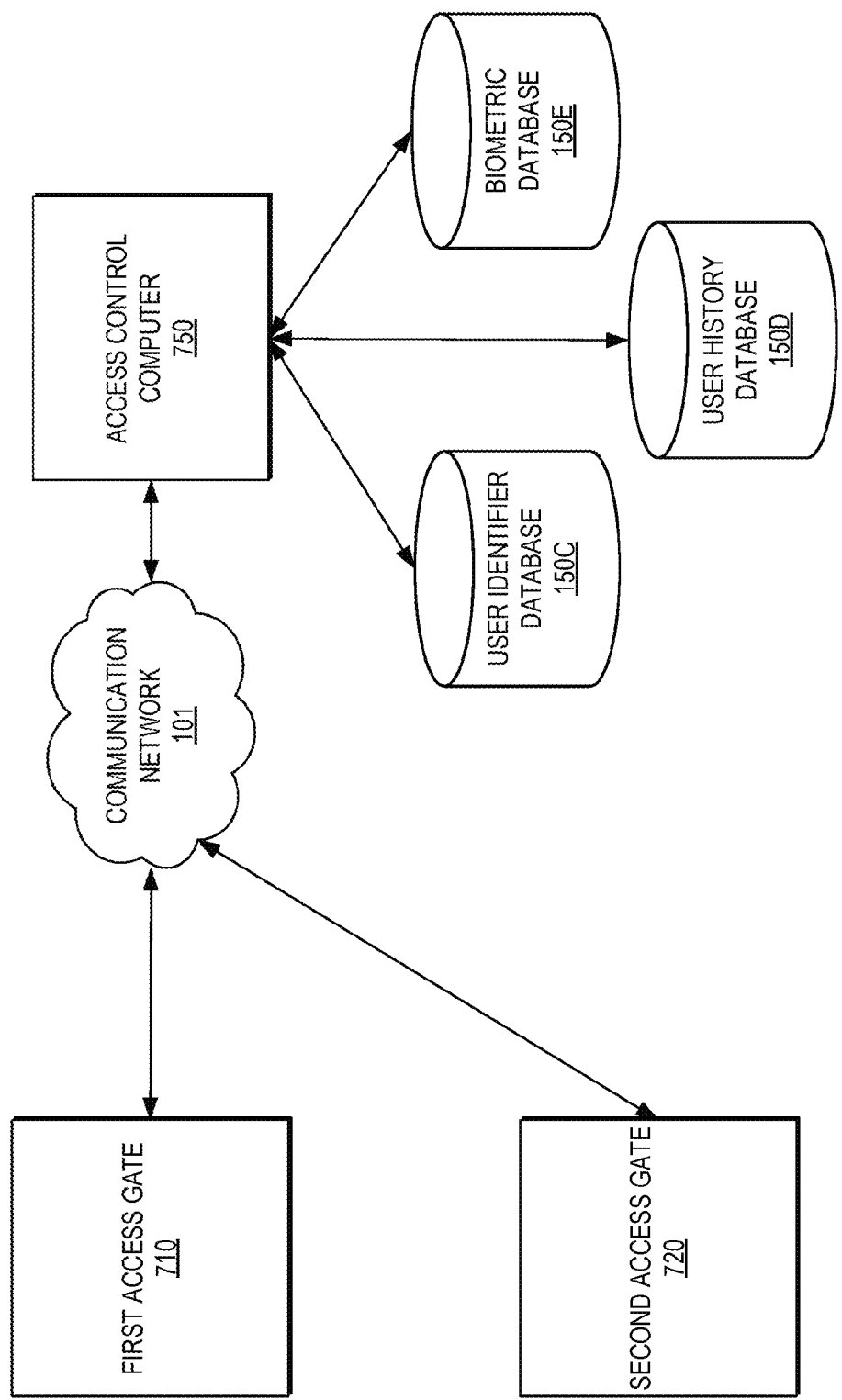
FIG. 7 shows a block diagram of a physical access system according to an embodiment of the invention.

The system 700 in FIG. 7 allows a user to gain physical access using biometric authentication, regardless of whether the user has entered from a specific access gate before. The system 700 includes a first access gate 710 and a second access gate 720, each of which can provide access to a physical space based on biometric authentication. The system 700 further comprises an access control computer 750, which can store biometric authentication data, as well as determine a user account based on device parameters and a biometric template.

Upon first using the first access gate 710 to enter a building, the user may enter a user ID (e.g., an employee badge number), which can be transmitted to the access control computer 750. The access control computer 750 can identify a user's reference biometric template (e.g., which may have been already created at a central security office), and then transmit the reference biometric template to the first access gate 710. The first access gate 710 can then prompt the user to provide a new biometric, and then authenticate the user by confirming that the new biometric template (based on the provided biometric) matches the reference biometric template.

The first access gate 710 can then store the user ID and the reference biometric template. As a result, when the user returns to the first access gate 710, the user can simply provide a biometric, and not have to re-enter the user ID. The first access gate 710 can identify compare the new biometric template with some or all of the locally stored reference biometric templates to determine if there is a match. Since the user's reference biometric template is stored at the first access gate 710, it should cause a match, and the user can be authenticated and granted entry.

This process can be safe and have a low chance of a false-positive result, because only a subset of reference biometric templates may be considered. For example, only the reference biometric templates that are locally stored at the first access gate 710 may be used, as opposed to all of the reference biometric templates within the entire system 700. Further, the first access gate 710 may only compare the new biometric template with reference biometric templates that have been recently used to gain entry (e.g., within the last day, week, month, or year).

The user may typically use the first access gate 710 to enter the building. In some embodiments, the first access gate 710 can track information about when the user enters the building, such as times of day. This data can be transmitted back to the access control computer 750.

At a later time, the user may attempt to enter the building using the second access gate 720 at a later time. In some embodiments, user can provide a user ID, and the reference biometric template can be obtained from the access control computer 750 as described above for the first access gate 710. Alternatively, the second access gate 720 can prompt the user for a biometric. The second access gate 720 can then send a new biometric template along with parameter data (e.g., a time of day, or day of the week) to the access control computer 750. The access control computer 750 can then determine a subset of reference biometric templates based on the parameter data. If the user is entering second access gate 720 at a same or similar time as when the user typically enters the first access gate 710, the user's reference biometric template can be obtained as part of the subset of reference biometric templates. Then, the access control computer 750 can compare the new biometric template with the determined subset of reference biometric templates, and find that the new biometric template matches the appropriate reference biometric template within the subset.

The access control computer 750 can then generate and send a message to the second access gate 720 indicating that the user was successfully authenticated, and the second access gate 720 can allow the user to enter the building. The access control computer 750 can also provide the user's matching reference biometric template to the second access gate 720 for storage and future use.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    measuring, by a user device, a second parameter value;
    sending, by the user device, to a server computer, a request for accessing a first dataset, wherein the first dataset is associated with a first reference biometric template and a first parameter value at the server computer, wherein the request includes a query biometric template and the second parameter value associated with the user device, wherein the server computer determines a subset of datasets from a plurality of datasets based on the second parameter value, the subset of datasets including more than one dataset and less than the plurality of datasets, each of the subset of datasets corresponding to a different user, and the subset of datasets including the first dataset, the server computer retrieves a subset of reference biometric templates including, for each dataset in the subset of datasets, a corresponding reference biometric template, the server computer identifies a matching reference biometric template from among the subset of reference biometric templates that matches the query biometric template within a predetermined threshold, wherein the matching reference biometric template that matches the query biometric template is the first reference biometric template associated with the first dataset, and the server computer authenticates the query biometric template based on a comparison with the first reference biometric template;
    receiving, by the user device, from the server computer, an authentication approval message that allows the user device to access to the first dataset; and
    accessing, by the user device, the first dataset.

2. The method of claim 1, wherein the user device is a second user device, wherein the server computer receives the first reference biometric template and the first parameter value from a first user device associated with the first dataset, the first parameter value is associated with the first user device, the second parameter value is associated with the second user device, the server computer receives the first parameter value when the first user device is being used to access the first dataset, and wherein the server computer determines that the second parameter value matches the first parameter value within a predetermined range.

3. The method of claim 2, wherein the first parameter value is a first location, wherein the second parameter value is a second location.

4. The method of claim 1, wherein the first dataset is associated with a user identifier, wherein the authentication approval message includes the first reference biometric template and the user identifier, and further comprising:
    storing, by the user device, the user identifier and the first reference biometric template, wherein accessing the first dataset includes performing a subsequent user authentication based on the user identifier and the first reference biometric template.

5. The method of claim 1, wherein each dataset in the subset of datasets is associated with a respective parameter value that is within a predetermined range of the second parameter value, wherein the first parameter value is within the predetermined range of the second parameter value.

6. The method of claim 5, further comprising:
    receiving, by the user device, from the server computer, an instruction to prompt a user for a biometric template type;
    prompting, by the user device, the user to select the biometric template type;
    receiving, by the user device, from the user, a selection of the biometric template type;
    sending, by the user device, to the server computer, the selected biometric template type, wherein the server computer determines the subset of datasets further based on the selected biometric template type, wherein each dataset in the subset of datasets is associated with a reference biometric template of the selected biometric template type;
    receiving, by the user device, from the server computer, an instruction to obtain a biometric template of the selected biometric template type;
    receiving, by the user device, from the user, a biometric; and
    generating, by the user device, the query biometric template, wherein the query biometric template is of the selected biometric template type.

7. The method of claim 1, wherein the first reference biometric template is a voice template, and further comprising:
    receiving, by the user device, from a user, a voice command; and
    generating, by the user device, the query biometric template based on the voice command.

8. The method of claim 7, further comprising:
    activating, by the user device, a service provider application in response to the voice command, and wherein the request for accessing the first dataset is sent based on the voice command.

9. The method of claim 1, wherein, before sending the request for accessing the first dataset, the user device has never accessed the first dataset, wherein the request does not include an identifier for the first dataset, and wherein the server computer identifies the first reference biometric template based on the second parameter value and not based on a user identifier.

10. A user device comprising:
  a processor; and
  a computer readable medium, the computer readable medium comprising code, executable by the processor, for implementing a method comprising:
  measuring a second parameter value;
  sending, to a server computer, a request for accessing a first dataset, wherein the first dataset is associated with a first reference biometric template and a first parameter value at the server computer, wherein the request includes a query biometric template and the second parameter value associated with the user device, wherein the server computer determines a subset of datasets from a plurality of datasets based on the second parameter value, the subset of datasets including more than one dataset and less than the plurality of datasets, each of the subset of datasets corresponding to a different user, and the subset of datasets including the first dataset, the server computer retrieves a subset of reference biometric templates including, for each dataset in the subset of datasets, a corresponding reference biometric template, the server computer identifies a matching reference biometric template from among the subset of reference biometric templates that matches the query biometric template within a predetermined threshold, wherein the matching reference biometric template that matches the query biometric template is the first reference biometric template associated with the first dataset, and the server computer authenticates the query biometric template based on a comparison with the first reference biometric template;
  receiving, from the server computer, an authentication approval message that allows the user device to access to the first dataset; and
  accessing the first dataset.

11. The user device of claim 10, wherein the first parameter value is first location, wherein the second parameter value is a second location.

12. The user device of claim 10, further comprising:
  activating an application;
  in response to activating the application, prompting a user to provide a biometric;
  measuring the biometric; and
  generating the query biometric template based on the biometric.

13. The user device of claim 10, wherein the first dataset is a user account, and wherein the accessing the first dataset includes logging into the user account.

14. The user device of claim 10, wherein the authentication approval message includes the first reference biometric template in an encrypted form, and further comprising:
  decrypting the first reference biometric template; and
  storing the first reference biometric template at the user device.

15. The user device of claim 10, further comprising:
  encrypting the query biometric template, wherein the query biometric template included in the request is encrypted, and wherein the server computer decrypts the query biometric template.

16. The method of claim 2, wherein the first parameter value is a first time, wherein the second parameter value is a second time.

17. The method of claim 2, wherein the first parameter value is a first device condition, wherein the second parameter value is a second device condition.

18. The method of claim 2, wherein the first parameter value is a first battery level, wherein the second parameter value is a second battery level.

19. The method of claim 2, wherein the first parameter value is a first language setting, wherein the second parameter value is a second language setting.

* * * * *